(12) United States Patent
Roach et al.

(10) Patent No.: US 8,701,950 B2
(45) Date of Patent: Apr. 22, 2014

(54) COLLAPSIBLE AUTOMOBILE STORAGE CONTAINER

(76) Inventors: Robert Roach, Holt, MI (US); Craig Wieland, Mason, MI (US)

( * ) Notice: Subject to any disclaimer, the term of this patent is extended or adjusted under 35 U.S.C. 154(b) by 0 days.

(21) Appl. No.: 13/447,163

(22) Filed: Apr. 13, 2012

(65) Prior Publication Data
US 2012/0261452 A1 Oct. 18, 2012

Related U.S. Application Data

(63) Continuation of application No. 13/087,140, filed on Apr. 14, 2011, now abandoned.

(51) Int. Cl.
*B60R 9/00* (2006.01)
(52) U.S. Cl.
USPC ......... 224/404; 224/497; 296/37.5; 296/37.6; 220/6
(58) Field of Classification Search
USPC ......... 224/404, 403, 495, 497, 539, 542, 549; 296/37.1, 37.6, 37.14; 312/258–262; 108/11, 14, 51.3, 157.14; 220/6
See application file for complete search history.

(56) References Cited

U.S. PATENT DOCUMENTS

| | | | | |
|---|---|---|---|---|
| 4,230,227 A * | 10/1980 | Kowall et al. | ................. | 206/600 |
| 4,673,087 A * | 6/1987 | Webb | ............................ | 206/600 |
| 5,341,950 A * | 8/1994 | Sinz | ................................... | 220/6 |
| 5,782,372 A * | 7/1998 | Weiss et al. | ....................... | 220/8 |
| 5,862,932 A * | 1/1999 | Walsh et al. | ....................... | 220/8 |
| 5,875,912 A * | 3/1999 | Hobson | ........................ | 220/4.03 |
| 6,070,775 A * | 6/2000 | Tolley et al. | ................... | 224/404 |
| 6,254,162 B1 * | 7/2001 | Faber et al. | .................. | 296/39.2 |
| 6,401,995 B1 * | 6/2002 | Yuille et al. | ................... | 224/404 |
| 6,749,077 B1 * | 6/2004 | McAlpine et al. | ............ | 220/4.29 |
| 6,938,807 B2 * | 9/2005 | Victor | .......................... | 224/497 |
| 7,097,224 B2 * | 8/2006 | Lester et al. | ............... | 296/37.14 |
| 2004/0232016 A1 * | 11/2004 | Dietrich | ..................... | 206/315.3 |
| 2006/0266778 A1 * | 11/2006 | Allotey | .......................... | 224/403 |
| 2009/0321434 A1 * | 12/2009 | Rothschild et al. | ............... | 220/6 |

* cited by examiner

*Primary Examiner* — Justin Larson
*Assistant Examiner* — Phillip Schmidt
(74) *Attorney, Agent, or Firm* — Hanley, Flight and Zimmerman, LLC

(57) ABSTRACT

In an embodiment, a collapsible storage container for a bed of a pickup truck includes a set of panels, a connection system, and an attachment system. The set of panels are configured to form an enclosed area in a bed of a pickup truck. The set of panels are movable into a collapsed state and an uncollapsed state. In the collapsed state, the set of panels allow for substantially all of the bed of the pickup truck to be used. In the uncollapsed state, the set of panels form an enclosed area. The connection system connects the set of panels together such that the panels are movable into a collapsed state and an uncollapsed state. The attachment system is configured to connect the set of panels to the bed of the pickup truck.

15 Claims, 37 Drawing Sheets

US 8,701,950 B2

COLLAPSIBLE AUTOMOBILE STORAGE CONTAINER

CROSS-REFERENCE TO RELATED APPLICATIONS

The present application claims the benefit of and priority to U.S. patent application Ser. No. 13/087,140, filed on Apr. 14, 2011, for "Collapsible Storage Container for a Bed of a Truck", which is incorporated herein by reference in its entirety.

BACKGROUND

The present embodiments generally relate to storage containers for automobiles, such as pickup trucks, sports utility vehicles and the like.

A pickup truck (which may be referred to as a truck) is a motor vehicle or automobile with an open-top rear cargo area which is generally (but does not have to be) separated from a cabin to allow for chassis flex when carrying or pulling heavy loads. The open-top rear cargo area is generally referred to as the bed of the truck. The bed of the truck is generally configured to store, carry, or haul various items. However, because the bed of the truck has an open top (i.e., is not covered), the various items are generally exposed to the weather and/or the possibility of theft. Furthermore, because of the bed of the truck is generally sized to store, carry, or haul larger items (e.g., gravel and wood), smaller items (e.g., groceries or tools) may slide around the bed of the truck. For some items, such as gravel, wood, and landscaping items, being exposed to the possibility of weather, theft, and sliding around is generally not a problem. However, for other items, such as carpentry tools, groceries, and clothes, being exposed to the possibility of weather, theft, and sliding around is generally not acceptable. In some situations, the person using the truck may choose to place these items in the cabin of the truck to prevent exposure.

BRIEF DESCRIPTION OF THE DRAWINGS

Example embodiments are described herein with reference to the following drawings.

Figure 1A:
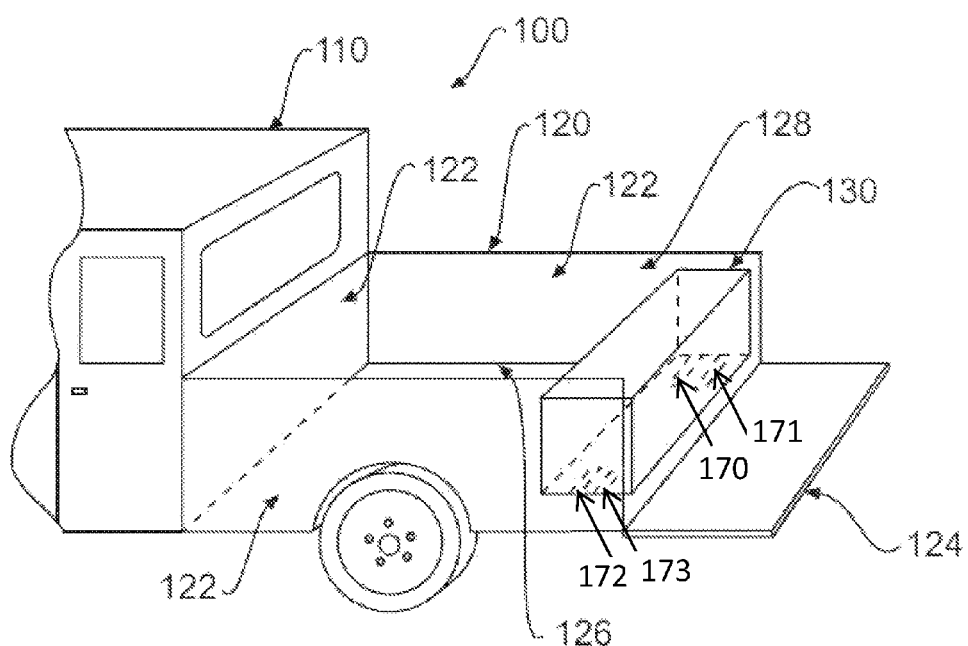
FIG. 1A illustrates an example of a collapsible storage container in an uncollapsed position.

The following detailed description may be better understood when read in conjunction with the drawings which show certain example embodiments. The drawings are for the purpose of illustrating concepts, but it is understood that the inventions are not limited to the arrangements and instrumentality shown in the drawings.

DESCRIPTION

Brief Description

The present embodiments relate to a collapsible storage container for an automobile, such as a truck, sport utility vehicle (SUV), all terrain vehicle (ATV) (e.g., quad, quad bike, three wheeler, four wheeler, etc.), and the like. Flat cargo trailers (e.g., for transport of snow-mobiles, motor-cycles, ATVs, etc.) can also utilize a collapsible storage container (e.g., collapsing the container while using the trailer to transport the vehicle and then erecting the container to store belongings while using the transported vehicle).

The collapsible storage container is a storage container that may be collapsed or uncollapsed. When collapsed, the storage container allows for all or substantially all of a bed of a truck to be used. However, when uncollapsed, the storage container may protect items placed in the interior of the storage container from the possibility of weather, theft, and sliding around the bed of the truck. The collapsible storage container may transition, either manually or electronically, between a collapsed position and uncollapsed position. As a result, the collapsible storage container allows a user to utilize a storage container in the bed of the truck (e.g., when the collapsible storage container is uncollapsed), but also utilize the entire bed of the truck (e.g., when the collapsible storage container is collapsed).

As used herein, the term "collapsible" includes foldable, pivotable, or otherwise movable into and out of a collapsed position and/or uncollapsed position. "Collapsed" may include caved in, folded, pivoted, broke down, reduced in size, or otherwise moved from an uncollapsed position to a collapsed position. "Uncollapsed" may include extended, elongated, enlarged, expanded, fanned out, heightened, increased, lengthened, let out, opened, prolonged, prolongated, raised, spun out, spreaded, stretched, unfolded, unrolled, widened, or otherwise moved from a collapsed position to an uncollapsed position.

In an embodiment, a collapsible storage container for a bed of a pickup truck includes a set of panels, a connection system, and an attachment system. The set of panels are configured to form an enclosed area in a bed of a pickup truck. The set of panels are movable into a collapsed position and an uncollapsed position. The set of panels, in the collapsed position, may be used as the bed of the pickup truck. The connection system connects the set of panels together. The connection system allows the set of panels to be movable into the collapsed position and the uncollapsed position. The attachment system is configured to connect the set of panels to the bed of the pickup truck.

In another embodiment, a system includes a storage container. The storage container is configured to be moved into and out of a collapsed position. The storage container includes an attachment system that is configured to connect the storage container to a bed of a pickup truck. The storage container includes an enclosed area that is located in an open-top cargo area of the bed of the pickup truck when the storage container is moved out of the collapsed position.

In yet another embodiment, a bed of a pickup truck includes an open-top cargo area. The open-top cargo area is located between one or more side walls, a tailgate, and a floor. The open-top cargo area is sized to receive a collapsible storage container. Either one or more of the side walls, the tailgate, or the floor are configured to receive the collapsible storage container. The collapsible storage container is configured to be moved into and out of a collapsed position. The collapsible storage container includes an attachment system that is configured to connect the storage container to either the one or more side walls, the tailgate, or the floor. The storage container includes an enclosed area that is located in an open-top cargo area of the bed of the pickup truck when the storage container is moved out of the collapsed position.

Reference herein to "embodiment" means that a feature, structure, or characteristic described in connection with the embodiment can be included in at least one embodiment. The appearance of this phrase in various places in the specification is not necessarily all referring to the same or single embodiment or even different and mutually exclusive embodiments. Separate or alternative embodiments are not mutually exclusive embodiments. Instead, the embodiments described herein, explicitly and implicitly understood by one skilled in the art, may be combined with other embodiments. The embodiments and combinations thereof are all within the scope of this patent document.

It is also worth noting that unless stated otherwise the various embodiments disclosed herein are not limited in their application to the details of design and arrangement of the components set forth in the previous and following description or as illustrated in the drawings. Instead, the previous description, following description, and the drawings focus on presenting concepts of various embodiments. The embodiments described herein may stand alone or be combined with each other.

One or more of the embodiments may be embodied as a method, system, article of manufacture, apparatus, or device. It should be noted that the methods, systems, articles of manufacture, apparatus, and devices provided herein are merely illustrative and should not be considered as limiting. Accordingly, while the following describes example methods, systems, articles of manufacture, and apparatus, the examples provided are not the only way to implement such methods, systems, articles of manufacture, and apparatus.

Detailed Description

FIG. 1 illustrates a truck 100. The truck 100 includes a cabin 110 and a bed 120. The bed 120 is generally (but does not have to be) separated from (e.g., independent of) the cabin 110 to allow for chassis flex when carrying or pulling heavy loads. The cabin 110 is coupled with the bed 120. As used herein, the term "coupled with" may include a direct connection or indirect connection via one or more intermediary components. For example, the cabin 110 may be welded directly to the bed 120 or connected via a motor-vehicle chassis. The truck 100 may include additional, different, or fewer components.

The truck 100 shown in FIG. 1 is a pickup truck. As will be discussed in more detail below, a pickup truck includes side walls along the edge of the bed 120. However, in some embodiments, a collapsible storage container in accordance with an embodiment may be installed in or used with a vehicle that is pulling a trailer or even a semi-truck. For example, a collapsible storage container may be installed on a trailer that does not include as many (e.g., relative to a pickup) or any side walls along the edges of the floor of the trailer. In another example, a collapsible storage container may be installed in a semi-truck (e.g., near the rear doors).

The cabin 110 is an enclosed space where at least the driver is seated when driving the truck 100. The cabin 110 may be referred to as a "cab." The cabin 110 may be any now known or later developed cabin of a truck. For example, the cabin 110 may be a standard cabin, extended (or super) cabin, or crew cabin. A standard cabin has a single row of seats and a single set of doors, one on each side. Most pickups have a front bench seat that can be used by two or more people; however, various manufacturers have begun to offer individual seats with a console in the middle of the seats. An extended cabin includes additional space behind the main seating area. This additional space may be accessed by reclining the front bench forward or a rear access door on one or both sides of the cabin 110. A rear access door may be a door hinged on the trailing edge, which is the edge closer to the rear of the truck 100. One or more seats may be placed in the area behind the front bench. For example, in an embodiment, the cabin 110 may include a side-facing seat that can fold into the walls behind the front bench. However, in other embodiments, a full bench may be placed in the back. A crew cabin may be a cabin with four-doors. A crew cabin includes seating for up to five or six people on two full benches and full-size front-hinged doors on both sides. Most crew cab pickups have a shorter bed or box to reduce their overall length.

The bed 120 includes one or more side walls 122, a tailgate 124, and a floor 126. The side walls 122, tailgate 124, and floor 126 are configured to form an open-top cargo area 128. The open-top cargo area 128 may be used for carrying or hauling cargo, such as tools, gravel, groceries, clothes, or other items. Because the bed 120 is an open-top cargo area 128, the various items being carried or hauled are exposed to the weather and the possibility of theft. For some items, such as gravel and wood, weather and/or theft are generally not a problem. However, for other items, such as carpentry tools, groceries, and clothes, being exposed to the weather and theft are generally a concern.

In an embodiment, the bed 120 includes a collapsible storage container 130. As shown in FIG. 1A, the bed 120 includes a collapsible storage container 130 in an uncollapsed position. "Uncollapsed" may include extended, elongated, enlarged, expanded, fanned out, heightened, increased, lengthened, let out, opened, prolonged, prolongated, raised, spun out, spread, spread out, stretched, unfolded, unrolled, widened, or otherwise moved from a collapsed position to an uncollapsed position. In the uncollapsed position, the collapsible storage container 130 is not collapsed. In the uncollapsed position, the storage container 130 may be enclosed and configured to store, haul, or carry cargo. In other words, the collapsible storage container 130 may be closed off on all sides. The inside or interior of the storage container 130 may be used as a cargo container to prevent cargo from sliding, being exposed to weather, and/or being stolen.

When in the uncollapsed position, the collapsible storage container 130 is in the bed 120 of the truck 100. The collapsible storage container 130 when uncollapsed may take up space of the bed 120 of the truck. For example, the collapsible storage container 130 when uncollapsed may take up more space of the bed 120 than the collapsible storage container 130 when collapsed. Relative to the collapsed position, the uncollapsed position may require more cubic footage of the bed 120.

In some embodiments, although one or more of the side walls of the collapsible storage container 130 may share side walls with the bed 120 of the truck 100, the inside or interior of the storage container 130 (i.e., the area that stores, hauls, or carries cargo) is disposed in the open-top cargo area 128. For example, when uncollapsed, the inside or interior of the collapsible storage container 130 may be disposed between the side walls 122 and the tailgate 124, as well as being above the floor 126. The interior or inside of the collapsible storage container 130, when uncollapsed, is not inside the side walls of the bed 120 of the truck 100 or beneath the floor 126. For example, the collapsible storage container 130 is not a container inside of a compartment built in a side wall 122. Instead, the inside or interior of the collapsible storage container 130 may be disposed in the open-top cargo area 128. For example, the inside of the collapsible storage container 130 may be in the open-top cargo area when in the uncollapsed position. In the collapsed position, the collapsible storage container 130 may be unable to store, haul, or carry cargo.

The collapsible storage container 130, even in the uncollapsed position, is generally smaller than the bed 120 of the truck 100. For example, the bottom of the collapsible storage container 130, when in the uncollapsed position, may be less than half of the square footage of the bed 120 of the truck. In some embodiments, the bottom of the collapsible storage container 130, when in the uncollapsed position, may be less than a quarter of the square footage of the bed 120 of the truck. In some embodiments, the collapsible storage container 130 may be the same size or almost the same size as the bed 120 of the truck 100. The term "almost" accounts for the physical structure of the collapsible storage container 130.

Figure 1B:
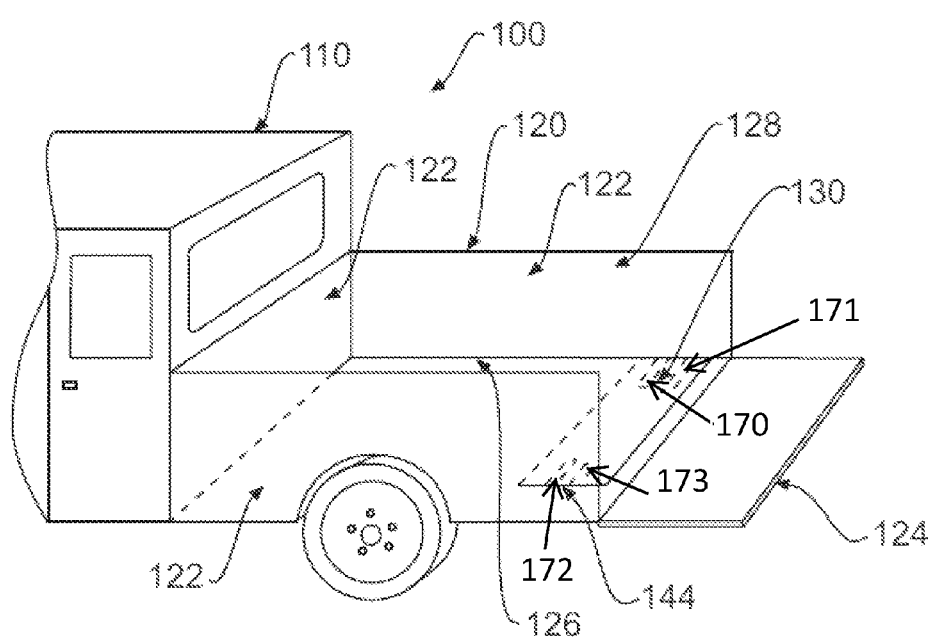
FIG. 1B illustrates an example of a collapsible storage container in a collapsed position.

FIG. 1B illustrates the collapsible storage container 130 in a collapsed position. As used herein, "collapsed" may include caved in, folded, pivoted, broke down, reduced in size, or otherwise moved from an uncollapsed position to a collapsed position. As will be discussed in more detail below, "collapsible" includes foldable, pivotable, retractable, or otherwise movable into and out of a collapsed position and/or uncollapsed position. As such, the collapsible storage container 130 is a storage container that provides a user the opportunity to store, haul, or carry cargo in a storage container in the bed 120 of the truck 100 but then, when the bed 120 of the truck is desired, collapse the storage container such that the bed 120 of the truck 100 may be used as a bed 120 of the truck 100.

The collapsible storage container 130 is generally located, when in the uncollapsed position, near the tailgate 124. This location may allow a user to reach the collapsible storage container 130 without climbing into the bed 120 of the truck 100. However, the location of the collapsible storage container 130 is not limited, for example, as long as it is disposed in the bed 120 when in an uncollapsed position. For example, the collapsible storage container 130 may be disposed near the cab 110, as opposed to near the tailgate 124. In this example, a user may reach over a side wall 122 of the bed 120 or climb into the bed 120 to access the collapsible storage container 130. Other locations and ways of accessing the collapsible storage container 130 are included within the scope of this description.

For example, the collapsible storage container 130 may be oriented in a variety of ways in a truck bed or other vehicle platform. While many of the figures show the container 130 oriented with ends facing side wall of a truck bed, the container 130 may be position such that the ends face the cab and tailgate of the truck. Other orientations or positioning are envisioned as well.

The collapsible storage container 130 may be made of one or more materials. For example, the collapsible storage container 130 may be made of plastic, metal, wood, or other material. The material may be weatherproof. For example, stainless steel or plastic may be used to protect against rain and snow. The material may also prevent or at least deter theft. For example, a hard plastic, such as Teflon, may be used to protect against both the weather and theft.

For example, the collapsible storage container 130 may be designed to fit in the back of a truck bed or other vehicle back. The sides and top of the example collapsible storage container 130 are made of insulated High Density Polyethylene, and the hinges, locks and brackets are stainless steel. The example collapsible storage container 130 is engineered to be weather resistant and lockable and also secures cargo from rolling around in the bed of the truck or other vehicle/trailer. The example container 130 is fastened to the truck bed with four stainless steel bolts that, when retracted from the frame of the container 130, apply a strong sideways pressure to the wheel well area, securing the unit to the vehicle. The container 130 may be built into a vehicle, sold as an accessory by an automotive dealer or manufacturer, sold as an "after-market" item, etc.

The collapsible storage container 130 may include a security system. The security system may include an alarm system that alarms a user or others near the collapsible storage container 130 when the interior of collapsible storage container 130 is being accessed with authorization. For example, the collapsible storage container 130 may include an audio alarm that sounds an alarm if the collapsible storage container 130 is opened without disabling or disarming the alarm. The audio alarm may alert others in the nearby area that the collapsible storage container 130 is being opened. The alarm system may include a key pad or wireless remote system that allows the user to disarm the alarm system and access the collapsible storage container 130 without the alarm being triggered.

One or more of the side walls of the collapsible storage container 130 may be configured to provide access to the inside or interior of the collapsible storage container 130. For example, one of the side walls may fold down or up to allow access to the inside of the storage container when in an uncollapsed position. In other embodiments, instead of moving the entire side wall, a door or window may be provided to the inside of the collapsible storage container 130. In some embodiments, both a side wall that provides access (e.g., folds up) and a door may be provided. When something large needs to be retrieved from or placed in the inside of the collapsible storage container, one or more side walls may be folded down or up, for example. However, a door or window may also be provided to allow the user to retrieve or place something small on the inside of the collapsible storage container. When access is not needed, the one or more sides may be configured to prevent access to the inside.

When in the collapsed position, the collapsible storage container 130 takes up little (if any) of the open-top cargo area 128. The collapsible storage container 130 may be unable to store, carry, or haul cargo when in the collapsed position. When the storage container 130 in an uncollapsed position, the storage container 130 provides a storage container that may be used to store, carry and haul cargo. The collapsible storage container 130, when uncollapsed, may be weatherproof and/or secure from theft, such that the cargo inside the collapsible storage container 130 is protected from the weather and theft. Weatherproof may include protection against rain, snow, wind, or other weather. Secure from theft may include protection against theft. For example, the collapsible storage container 130 may deter or slow down a theft (e.g., relative to not having a collapsible storage container 130).

The collapsible storage container 130 may be manually and/or electrically moved from a collapsed position to an uncollapsed position. For example, a user may manually move the collapsible storage container 130 between the collapsed and uncollapsed positions. The collapsible storage container 130 may include one or more handles that are used for assisting with converting between the collapsed and uncollapsed positions. In another example, the collapsible storage container may be automatically (with zero or little assistance from a user) moved. The collapsible storage container 130 may be connected to an electrical system that automatically moves the collapsible storage container 130. A user may initiate movement (e.g., by pressing or pressing and holding a button) between the movements. The electrical system then drives the collapsible storage container 130 between the positions.

The collapsible storage container 130 may include one or more compartments or sections. The interior of the collapsible storage container 130 may include a compartment system that allows a user to compartmentalize the inside or interior of the collapsible storage container 130. For example, the inside or interior may include two compartments. One compartment may be a smaller compartment that is used to carry items that are likely to move around, such as groceries. Another compartment may be larger (e.g., relative to the smaller compartment) and used to carry larger items, such as tools, computers, etc.

The collapsible storage container 130 may include one or more dividers made of plastic or some other rigid material to be installed into the base of the container 130. For example, one or more dividers may be integrated as part of the container 130 or one or more dividers that form part of an installed bed liner that can be "flipped up" to a position perpendicular to the base of the container 130. The flip-up divider(s) may help prevent items in the fully erected container 130 from rolling from side to side as easily as the items might if the dividers were not employed. When the divider(s) are not desired or when the container 130 is in its fully collapsed position the divider(s) are "flipped down" and lie virtually flush with the top of the base, for example.

The collapsible storage container 130 may include a non-skid base. For example, the base of the container 130 (e.g., either a base that is integrated as part of the container 130 or a base that is part of an installed bed liner) may be made up of a "non-skid"-type surface. The base may be made to be non-skid through material used in the manufacture of the base itself or by applying a material after manufacture of the base to make the base skid resistant, for example.

The collapsible storage container 130 may include one or more attachments or accessories. For example, the collapsible storage container 130 may include a cargo light. The cargo light can be installed on or in one or more sides of the container 130 (e.g., top, back, and/or two sides of the collapsible storage container 130). In its collapsible state, for example, all four "undersides" of the top, back, and side panels of the container 130 are protected due to the way the panels collapse inward or on each other. The cargo light may be an incandescent light, light emitting diode (LED), or the like, and can be powered by a battery situated next to the light, directly from an existing vehicle battery, etc.

The collapsible storage container 130 may include a drain plug or stopper to allow the container 130 to retain and release fluid. For example, a drain plug or other closable opening may be installed in a bottom of the container 130 and/or bedliner. For example, if water (e.g., from rain, melting ice, etc.) or other liquid has collected in the container 130, the plug may be opened to allow the liquid to drain from the container 130.

The collapsible storage container 130 may include handles. For example, one or more handles or other grips may be positioned on or in the outside of the container such that once the container 130 is "un-hooked" or otherwise detached (e.g., from a truck bed or other vehicle, a base or receptacle on a truck bed or other vehicle, bedliner, etc.), the container 130 can be lifted and repositioned.

The collapsible storage container 130 may be insulated. For example, the walls of the container 130 may be constructed from an insulating material. Alternatively or in addition, insulation may be installed in the side(s), front, top, and/or back panels. For example, one or more panels may be insulated with material to delay effects of heat and/or cold transfer from inside the container 130 to outside and/or outside the container 130 to the inside.

The collapsible storage container 130 may include removable straps or netting inside the container 130. For example, straps, netting, and/or other support may be attached to one or more panels of the container 130 (e.g., attached to either of the two sides, top, back or front) such that it spans between two opposing panels to hold stationary items that may otherwise roll or shift in the container 130. The straps, netting, etc., may be removable such that they are installed at times and uninstalled and stored at other times.

The collapsible storage container 130 may include one or more indentations in a panel (e.g., a top or front panel, etc.) whereby a beverage container, such as a cup, bottle, can, etc., can be placed in an indentation. A beverage container placed in an indentation may be prevented from moving on the top of the container 130, for example, as easily as the beverage might without the recess.

It is noted that there may be one or more intermediary positions between a completely collapsed position (i.e., unable to store, carry, or haul any cargo) and a completely uncollapsed position. For example, the collapsible storage container 130 may be partially collapsed and able to store, carry, or haul some cargo. In a partially collapsed position, the collapsible storage container 130 is unable to store, carry, or haul as much cargo as when in the completely uncollapsed position but is still able to store, carry, or haul some cargo. However, because the collapsible storage container 130 is partially collapsed, the storage container 130 does not require as much cubic footage of the bed 120 as the storage container 130 in a completely uncollapsed position.

The collapsible storage container 130 includes an attachment system 144. The attachment system 144 may be used to connect or attach the collapsible storage container 130 to the bed 120 of the truck 100. The attachment system 144 may include screws, hooks, rods, hook-and-loop fasteners (e.g., VELCRO™), straps, snap-in modules, or other mechanisms for securing or fixing the storage container 130 to the bed 120 of the truck 100. In some embodiments, as will be discussed in more detail below, the attachment system 144 may be distributed between the collapsible storage container 130 and the bed 120 (or other component, such as a bed liner, that attaches to the bed 120). For example, the collapsible storage container 130 may include a male component that connects (e.g., snaps, screws, straps, or otherwise attaches) into a female component of the bed 120 or vice-versa.

The collapsible storage container 130 may include a support system. The support system may be used to support the collapsible storage container 130 in an uncollapsed position. The support system may be rigid side walls (e.g., as shown in FIG. 1A), a hook system, a telescoping rod system, or other system that is able to hold or maintain the collapsible storage container 130 in an uncollapsed position.

Figure 2A:
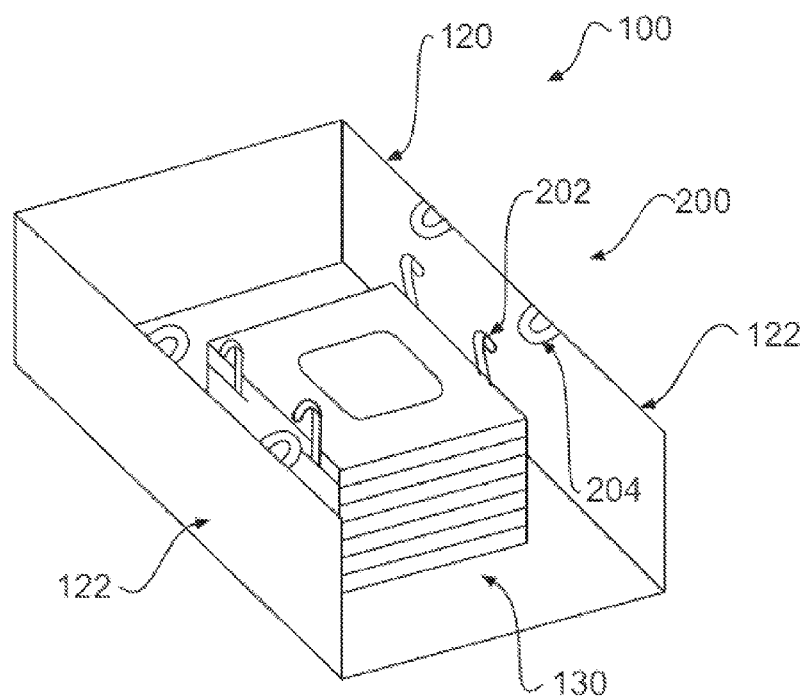
FIG. 2A-2C illustrate examples of a collapsible storage container with an attachment system.

For example, as shown in FIG. 1A, in some embodiments, the side walls of the collapsible storage container 130 are able to support themselves in the uncollapsed position. The side walls of the collapsible storage container 130 may be rigid and able to remain in an uncollapsed position. However, in other embodiments, the collapsible storage container 130 may need additional support. For example, as shown in FIG. 2A, the collapsible storage container 130 may include bellows for the side walls (e.g., as will be explained below for FIG. 9A-9C). The side walls are not self-supporting in the uncollapsed position. As shown in FIG. 2A, a hook system 200 may be used to hook a top, bottom, or side wall of the collapsible storage container 130 in an uncollapsed position. A hook 202, which is coupled with the collapsible storage container 130, may be hooked to a latch 204 on the top of the side walls 122 of the bed 120 of the truck 100. The hook 202 may hook onto the latch 204 to support the collapsible storage container 130.

In an embodiment, hooks may be tapered latch hooks. The tapered latch hooks (e.g., six tapered latch hooks) are located on the outside of the two side walls of the collapsible storage container 130. For example, two hooks are located on the outside of each side panel and two hooks are located on the inside of each side panel that are tapered from a "pointed end" to a thicker or more robust middle and base. As the latch 204 is turned into the receiving hook 202, the taper forces a tighter and tighter fit between the two panels. The tighter fit allows the container 130 to be weather tight when the latches (e.g., all six latches) are fully turned, for example.

In an embodiment, side panels may include tongue and groove sides. For example, side panels may include a tongue molded into an edge that lodges into a groove of a corresponding top, back, or front panel when the container 130 is fully erected. Using this design, potential incoming moisture is forced through a tortuous path up, over and around this tongue prior to being able to enter the cavity created by the fully erect CSC. The tongue may be constructed from a solid material, a flexible and/or crushable material (such as a semi-hard plastic or rubber), etc.

Figure 2B:
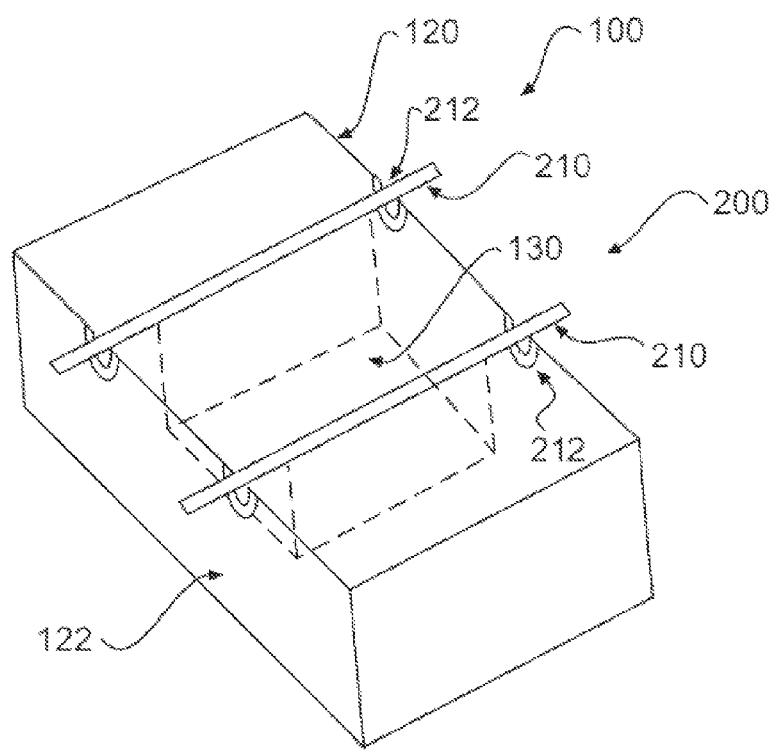

In another example, as shown in FIG. 2B, the support system 200 may include rods 210 that may be placed in an indentation 212 on the top of the side walls of the bed of the truck. The indentation 212 may keep the rods 210 from sliding around.

Figure 2C:
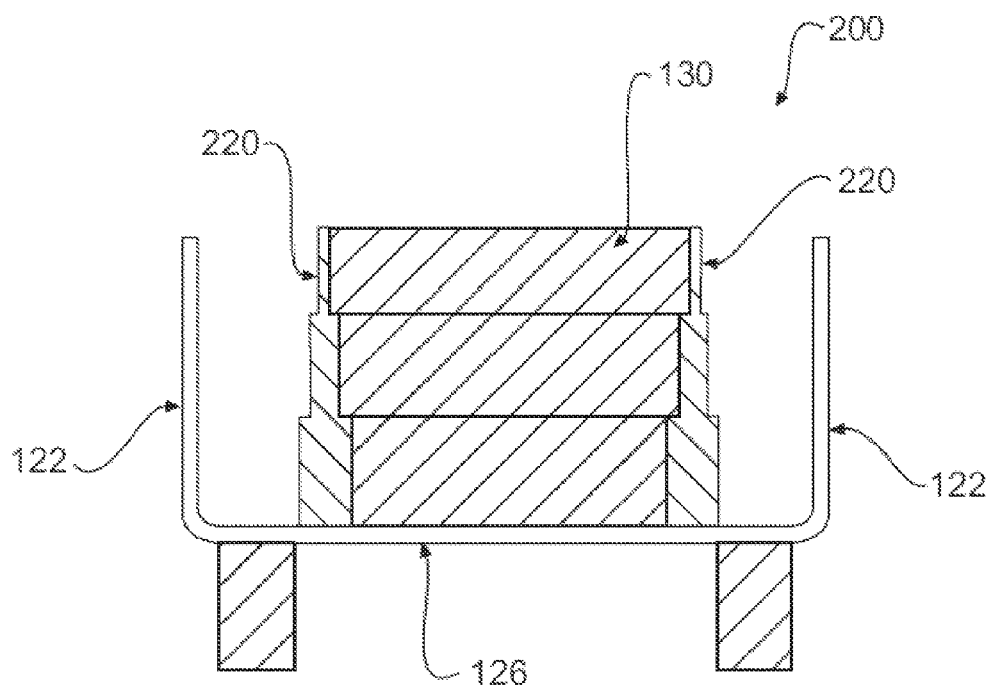

In yet another example, as shown in FIG. 2C, the support system 200 may include one or more telescoping rods 220. The one or more telescoping rods 220 may be coupled with the collapsible storage container 130. When the one or more telescoping rods 220 are extended, the telescoping rods 220 may hold the collapsible storage container 130 in an uncollapsed position. In order to move the collapsible storage container 130 into a collapsed position, the telescoping rods may decrease in length (e.g., one portion of a telescoping rod may slide into another portion and so on). When in a collapsed position, the telescoping rod system 2030 and the collapsible storage container 130 may be flush with the rest of the bed of the truck.

Foldable Storage Container(s)

Figure 3A:
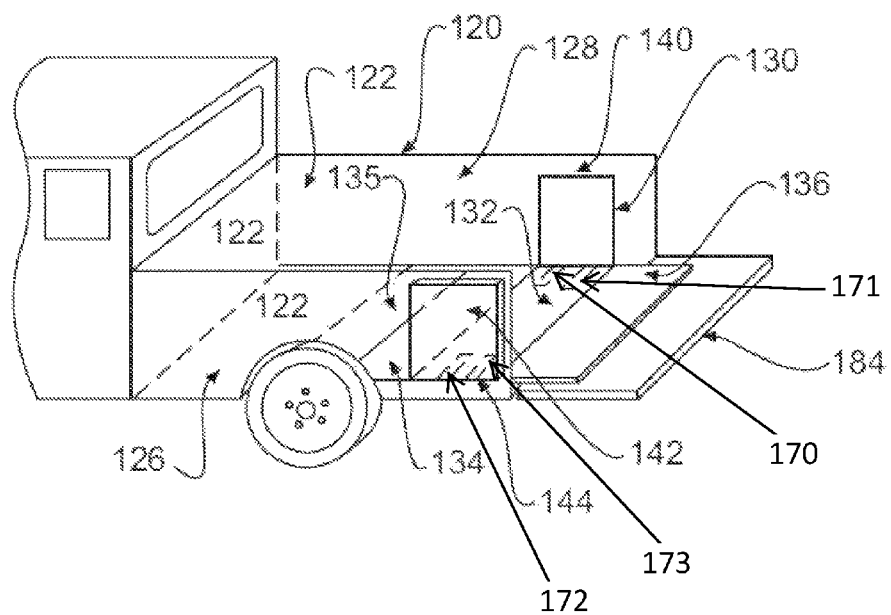
FIG. 3A illustrates an example of a collapsible storage container in a collapsed position.
Figure 3B:
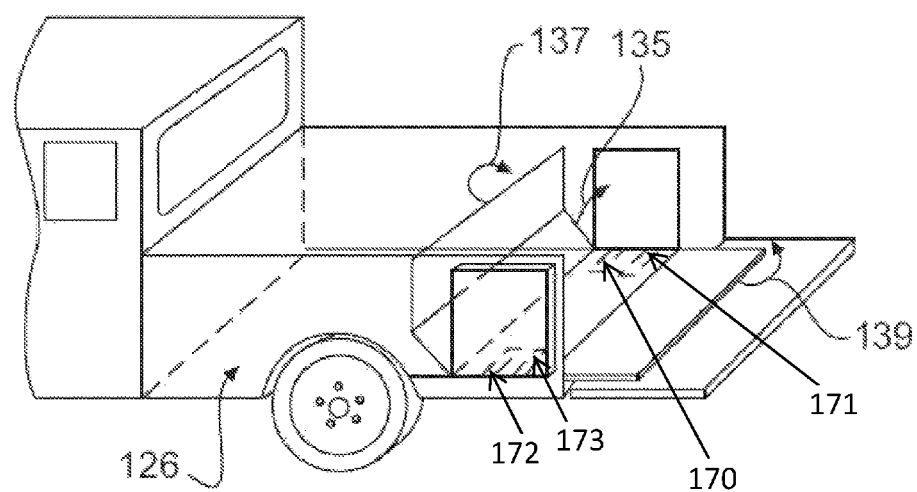
FIG. 3B illustrates an example of a collapsible storage container that is being moved from a collapsed position to an uncollapsed position.

FIG. 3A-3B illustrate a collapsible storage container 130 that is foldable. The collapsible storage container 130 may be folded from a collapsed position into an uncollapsed position. Likewise, the collapsible storage container 130 may be unfolded from the uncollapsed position into a collapsed position.

As shown in FIG. 3A, the collapsible storage container 130 includes a bottom side panel 132, a front side panel 134, a back side panel 136, a top side panel 138, a left side panel 140, and a right side panel 142. It is noted that the descriptions "bottom," "front," "back," "top," "left," and "right" are from the perspective of facing the front of the truck 100. (e.g., as used herein, the "front" is toward the cabin 110, the "bottom" is toward the ground, the "right" is toward the driver side of the truck in the United States). However, other descriptions may be used, for example, in the event that the collapsible storage unit 130 or truck 100 is rotated. The descriptions are intended to help illustrate the concepts and not limit the mechanics, structure, or various embodiments. A panel may be referred to as a wall or side of the collapsible storage container 130.

FIG. 3A illustrates the collapsible storage container 130 in a collapsed position. In the collapsed position, the collapsible storage container 130 provides use of all or substantially all of the open-top cargo area 128, which is the area between the side walls 122, tailgate 124, and floor 126. For example, in some embodiments, as shown in FIG. 3A, four of the panels 132-138 of the collapsible storage container 130 lay flat on the floor 126 (and/or tailgate) of the bed 120, while two of the panels 140, 142 are positioned against or adjacent to the sides 122 of the bed 120. Substantially the entire bed 120 may be used for carrying and hauling. As used at least in this example, "substantially" relates to the space taken up by the side walls of the collapsible storage container 120 when lying on top of or adjacent to the side walls 122, tailgate 124, and/or floor 126. For example, the term "substantially" takes into account the physical structure of the collapsible storage container 130. In another example, one or more of the side walls 122, tailgate 124, and floor 126 include (e.g., are manufactured with) an indentation that allows the side panels of the collapsible storage container 130 to be flush with the remaining portion of the sides 122, tailgate 124, and/or floor 126. The indentations allow for the entire bed 120 to be used for carrying and hauling, since the side walls of the collapsible storage container 130 are moved into the indentations when in a collapsed position. The indentation may take into account the physical structure of the collapsible storage container 130. For example, if one or more of the panels are an inch thick, then the indentation may be an inch deep to allow the one or more panels to lay in the indentation.

FIG. 3B illustrates the collapsible storage container 130 being folded from a collapsed position into an uncollapsed position. As shown by arrow 135, the front side panel 134 may fold toward the left and right side panels 140, 142. As shown by arrow 139, the back side panel 136 may fold toward the left and right sides 140, 142. In other words, the front side panel 134 and back side wall 136 may fold toward each other and connect with the left and right side panels 140, 142 to form an open-top storage container. However, as shown by arrow 137, as the front side wall 134 is folded up, the top side wall 138 may fold onto, along, or adjacent to the top of the left and right side walls 140, 142 to provide the top to the collapsible storage container 130. When folded together and connected, the side walls 132-142 form an enclosed area that may be used for storage, for example, while driving or parked.

All or some of the walls 132-142 may stay connected using connection system. The connection system may include magnets, snaps, screws, hinges, or other connectors that connect all or some of the panels 132-142 together. For example, in an embodiment, an inter-lock mounting system may be used. In this example, the front side wall 134 may include a male snap-in mount that inter-locks with a female snap-in mount on the left and right side walls 140, 142. The other side walls may also include other similar inter-locking connectors. In an embodiment, the connection system may allow some, but not all, of the panels 132-142, to move. This may be advantageous when the collapsible storage container is uncollapsed. For example, the connection system may allow the top panel 138 to move while the other panels 132-136 and 140-142 to remain connected. This will allow a user to access the inside or interior of the collapsible storage container 130, for example, when uncollapsed.

In some embodiments, the left and right side panels 140, 142 may also lay flat on the floor 126 when collapsed. This may reduce the interior size of the collapsible storage container 130 but may also reduce the complexity of the design of the collapsible storage container 130.

Figure 4:
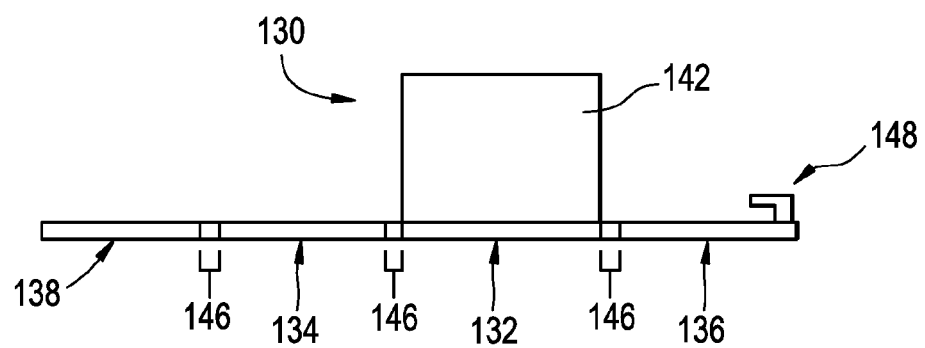
FIG. 4 illustrates a side view of an example collapsible storage container in a collapsed position.

FIG. 4 illustrates a side perspective of the collapsible storage container 130 of FIGS. 3A-3B. As shown in FIG. 4, in addition to the side panels 132-142, the collapsible storage container 130 includes hinges 146 that couple at least some of the side panels 132-142 with each other. The hinges 146 may be rubber hinges or other hinges that are weatherproof (e.g., able to prevent or deter water or other liquid from entering into the inside of the collapsible storage container 130). The hinges 146 may allow the sides to collapse. For example, in the embodiment shown in FIG. 3, the hinges 146 allow all or some of the panels 132-142 to fold away from each other when the collapsible storage container 130 is collapsed and fold toward each other (e.g., to form an enclosed storage container) when uncollapsed.

The collapsible storage container 130 may include a lock 148. The lock 148 may be a locking system (e.g., including one or more locks) that secures the collapsible storage container 130 when uncollapsed. The lock 148 may prevent one, some, or all of the walls from moving and providing access to the interior of the collapsible storage container 130. In some embodiments, the lock 148 may include a lock and key system on an edge of a first panel and an edge of a second panel. A user may insert a key into the locking mechanism to lock the collapsible storage container 130. The locking mechanism, when the collapsible storage container 130 is collapsed, may not extend out of the sides and snag objects being placed into the bed 120 of the truck 100.

Figure 5:
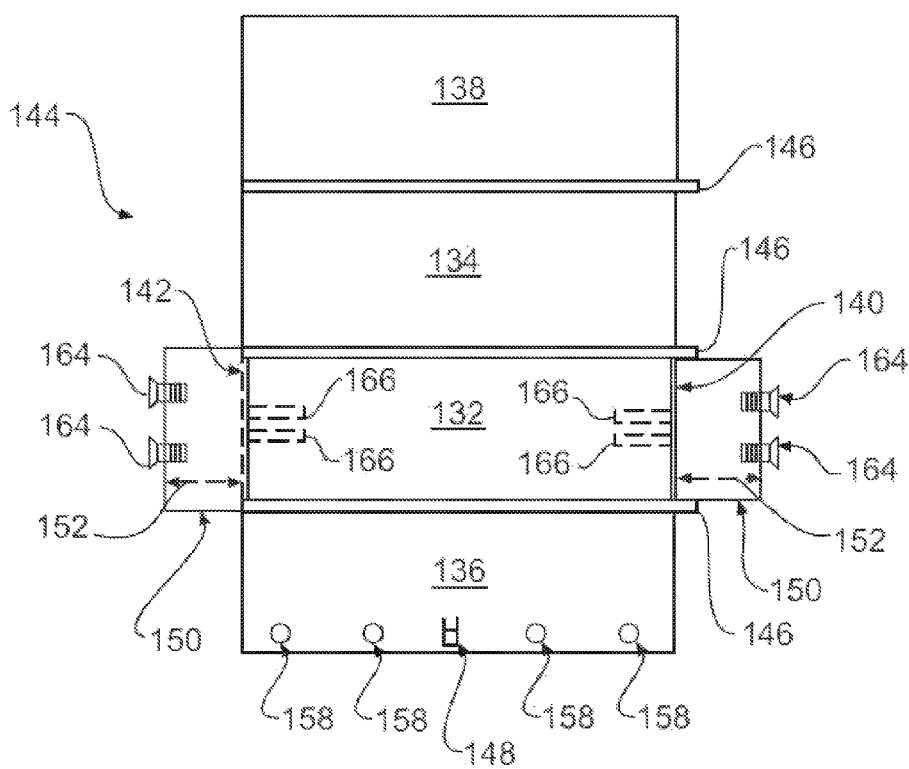
FIG. 5 illustrates a top view of an example collapsible storage container in a collapsed position.

FIG. 5 illustrates an example embodiment of a collapsible storage container 130 in a collapsed position (e.g., lying flat). The collapsible storage container 130 may include an attachment system 144. As mentioned above, the attachment system 144 may be used to attach the collapsible storage container 130 to a bed of the truck. For example, the attachment system 144 may be used to hold, set, put, or place the collapsible storage container in a rigid, permanent, non-movable, or secure position. The attachment system 144 may prevent someone from easily removing the collapsible storage container 130 from the bed of the truck.

An attachment system may be an invasive or non-invasive attachment system. An invasive attachment system is an attachment system that enters into the bed of the truck (e.g., is screwed into the bed of the truck). However, a non-invasive attachment system is an attachment system that attaches to the bed of the truck without entry into the truck.

Figure 6:
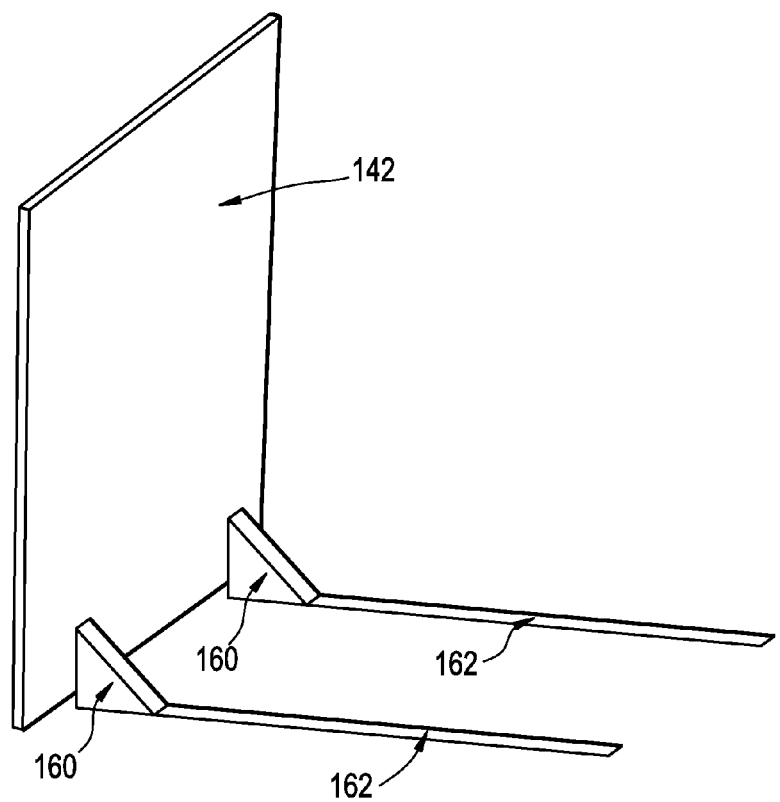
FIG. 6 illustrates an example of a side panel of a collapsible storage container.
Figure 7:
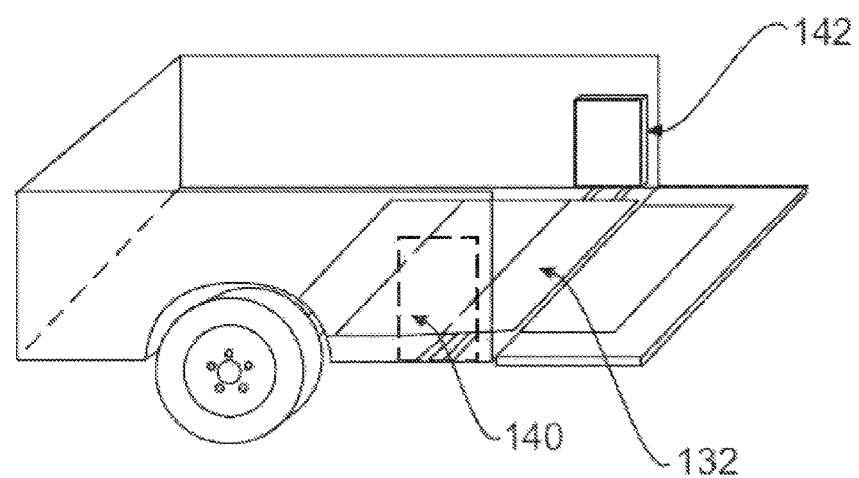
FIG. 7 illustrates another example of a collapsible storage container in a collapsed position.

FIGS. 5-7 illustrate an example of an embodiment of an attachment system 144. The attachment system 144 is a non-invasive attachment system. The attachment system 168 includes an attachment plate 150, pressure bolts 164, a rod and shaft system 166, 162, and a gusset 160. Additional, different, or fewer components may be provided. The collapsible storage container 130 may include or be configured to connect to an attachment system 150. The attachment system 144 attaches, secures or fixes the collapsible storage container 130 to the bed 120. The attachment system 144 may be attached to both the collapsible storage container 130 and the bed 120.

As shown in FIG. 5, the attachment plate 150 is secured to the bottom side panel 132. Securing the attachment plate 150 to the bottom side panel 132 may include screwing, nailing, gluing, hinging, clamping, manufacturing as a single piece, or otherwise attaching the two together. The pressure bolts 164 may be backed out of the attachment plate 150 up against the side walls 122 of the bed of the truck to secure the attachment plate 150 to the bed of the truck. The pressure bolts 164 may include holes that allow a lock (e.g., a pad lock) to be placed through the bolt 164 to prevent it from being loosened. Once the screws are tight against the bed of the truck, the attachment plate should not be able to be removed or move around.

The bottom panel 132 may include one or more shafts 166. The shafts 166 are sized to receive a rod 162 (shown in FIG. 6) that is connected to the side panel 142. The rod 162 guides the side panel 142 as shown by arrow 152. FIG. 6 illustrates a side panel 142 and the rod 162. A gusset 160 may be used to further support the connection between the rod 162 and side panel 142. As shown in the embodiment of FIGS. 5-6, the attachment system 144 may include a rod 162 and a shaft 166. The rod 162 may extend into the shaft 154. The shaft 166 may be a hole or tunnel that extends into the bottom panel 132.

As shown in FIG. 7, the rod 162 and shaft 166 allow the side panels 140, 142 to move adjacent to the side walls 122 of the bed of the truck so that as much of the bed of the truck may be used as possible. When in a collapsed position, the side walls 140, 142 may be moved away from the bottom panel 132 and toward the edges of the bed of the truck.

In some embodiments, the attachment system 150 may allow all, some, or one of the side panel 132-142 to move. For example, as shown in FIG. 7, the attachment system 150 may include one or more tracks, rods and shafts, or other connectors that allow for movement. FIG. 7 illustrates an embodiment where the side panels 140, 142 are extended away from the bottom panel 132 and toward the side walls of the bed of the truck.

It should be noted that instead of using a rod and shaft system as described above, the attachment system 144 may include a track system or telescoping system to provide for the movement of all, some, or one of the panels, for example. However, in other embodiments, the attachment system 168 does not allow for movement of any of the panels. Instead, with exception of the folding movement, the panels of the collapsible storage container 130 are not movable. For example, the left and right side walls 140, 142 may not move as shown by arrow 152 of FIG. 5.

Figure 8A:
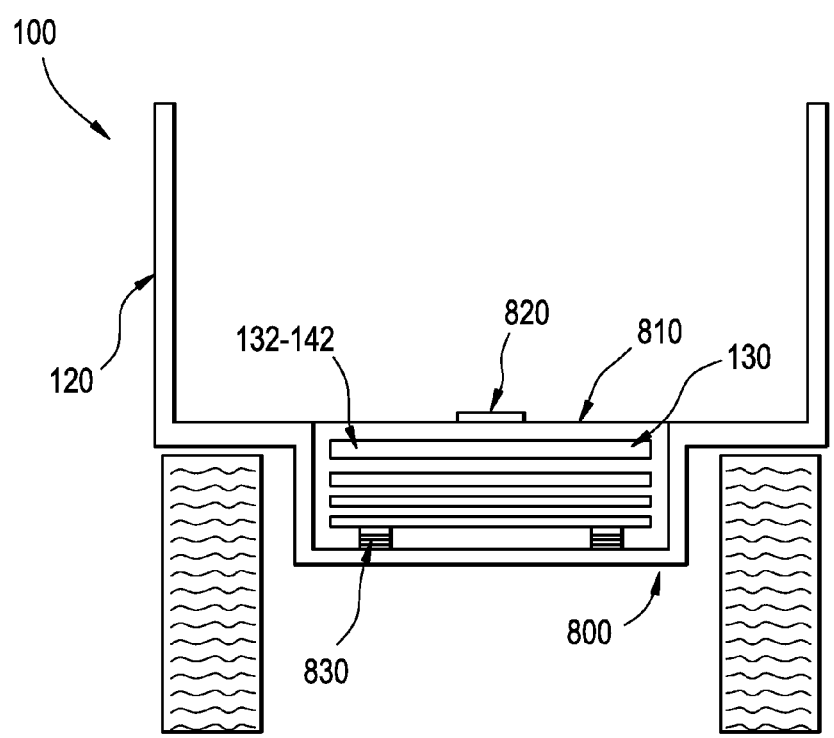
FIG. 8A illustrates another example of a collapsible storage container in a collapsed position.
Figure 8B:
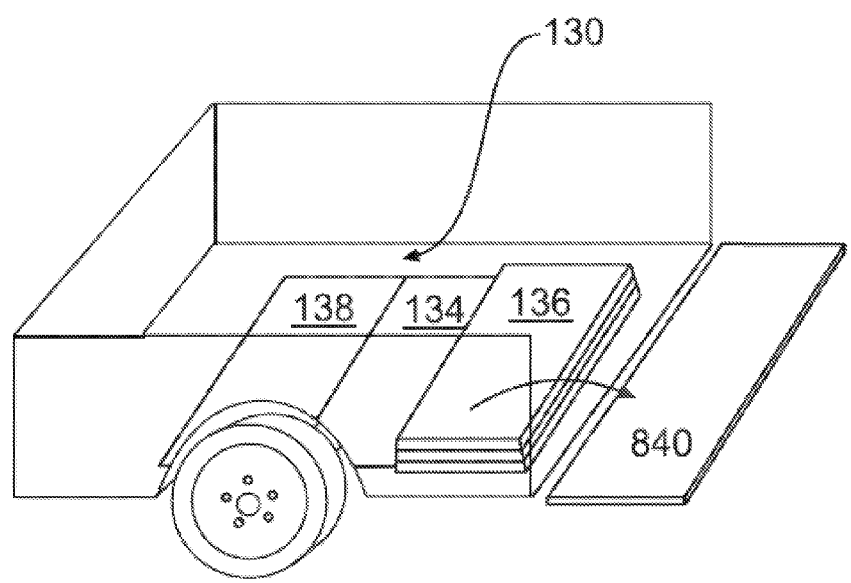
FIGS. 8B-8D illustrate another example of a collapsible storage container that is being moved from a collapsed position to an uncollapsed position.
Figure 8C:
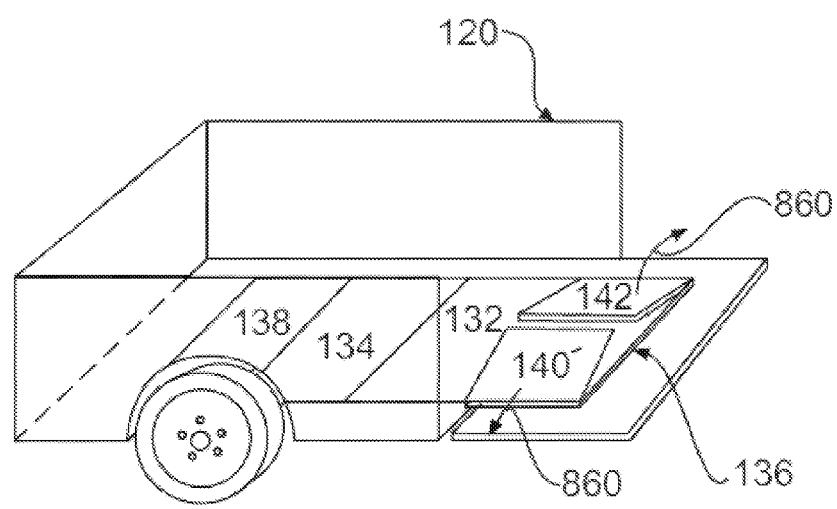

FIGS. 8A-8C illustrate an embodiment of a collapsible storage container 130. The embodiment(s) shown in FIGS. 8A-8C is/are similar, with respect to folding, to the embodiment(s) shown in FIGS. 3A-3C, except that the side panels 140, 142 also fold down. In other words, all of the side walls 132-142, including the side panels 140, 142 fold down into a collapsed position, as will be described and illustrated in more detail below.

FIG. 8A illustrates a rear-view of a collapsible storage container 130 in the bed 120 of a truck 100. The bed 120 includes a stow-away compartment 800. The stow-away compartment 800 may be built into (e.g., integrated) into the bed 120, for example, during manufacture of the bed 120. The stow-away compartment 800 may allow the collapsible storage container 130, when in a collapsed position, to be out of the way of the bed 120, such that the entire bed 120 may be used to haul, carry, or store cargo.

In some embodiments, the stow-away compartment 800 includes a door 810 with a handle 820. The handle 820 may be used to open the door 810. The handle 820 may be configured to allow a user to lift the door, for example, when the door 810 is closed using gravity or a light attaching mechanism, such as magnets or snaps. However, in other embodiments, the handle 820 is connected to a latch (e.g., including a lock) that latches the door 810. The handle 820 may be used to open the latch that is securing the door 810 shut.

The door 810 may be opened and shut. When the door 810 is opened, the collapsible storage container 130, which is collapsed when in the stow-away compartment 800, may be moved into an uncollapsed position. For example, in some embodiments, the door 810 may be opened and the collapsible storage container 130 removed from the stow-away compartment 800. The collapsible storage container 130, in the collapsed position, may attach to a guide, rail, spring, pivot, or other mechanism that allows the collapsible storage container 130 to be removed from the stow-away compartment 800. In some embodiments, once the collapsible storage container 130 is removed, the door 810 is closed. However, in other embodiments, the door 810 does not need to be closed. Instead, the door 810 needs to allow the collapsible storage container 130 to be moved into an uncollapsed position. For example, the door 810 may be on a hinge that moves the door 810 out of the way or the door 810 may slide out of the way.

As shown in FIG. 8B, once the collapsible storage container 130 is removed from the stow-away compartment 800, the panels 132-142 may be unfolded as shown in FIGS. 8B and 8C. The folding may be similar, but not necessarily the same, as the folding of FIG. 3B. For example, as shown in FIG. 8B, the front and top panels 134, 138 may be folded toward the front of the truck 100. The back and side panels 136, 140, 142 may be folded toward the back of the truck 100 (e.g., the tailgate), as shown by arrow 840. As shown in FIG. 8C, the side panels 140, 142, which are connected to the back panel 136 in this example, may be folded toward the sides of the bed 120, as shown by arrows 860.

Figure 8D:
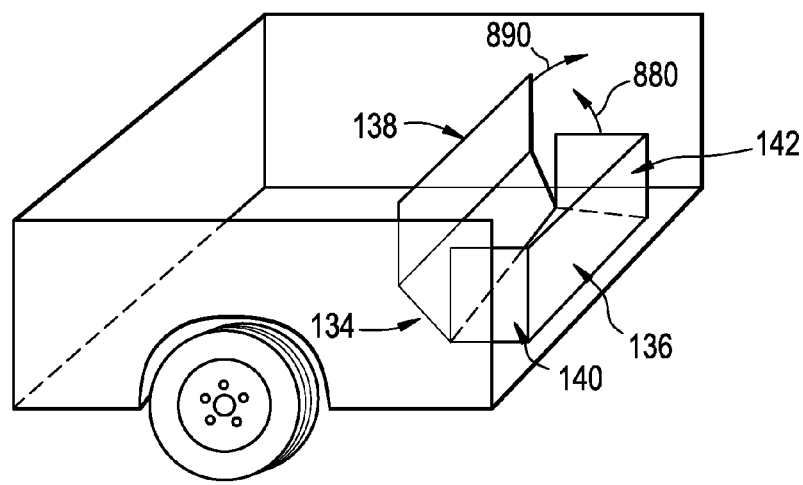

As shown in FIG. 8D, the back panel 136 and side panels 140, 142 may be folded toward the front of the truck 100, as shown by arrow 880. In FIG. 8D, the back panel 136 and side panels 140, 142 have already been folded. The arrow 880 shows the folding motion that already occurred. The front panel 134 and top panel 138 may be folded backwards, as shown by arrow 890. The various panels may then be connected together. Once connected together, for example, using a connection system, the collapsible storage container 130 is in the uncollapsed position. When the collapsible storage container 130 is moved back into the collapsed position, the user may unconnect the panels 132-142 and move the collapsible storage container 130 back into the stow-away compartment 800 of FIG. 8A. The door 810 may then be shut.

It should be noted that the method of folding and unfolding described herein are examples. Depending on how the collapsible storage container 130 is configured, the folding and unfolding may occur differently. For example, in FIG. 8C, the side walls 140, 142 may be connected to the bottom panel 132, front panel 134, or the top panel 138. This may change the way that the collapsible storage container 130 is collapsed and uncollapsed (e.g., folded and unfolded).

For example, top panel 138 and back panel 136 may fold in on themselves such that the panels collapse on top of each other, with the back panel 136 on bottom and the top panel 138 remaining on top.

In another example, side walls 140, 142 slide under the base or bottom panel 132. In this example, the front panel 134 folds forward, and the sides 140, 142 slide under the base 132. In an embodiment, the sides 140, 142 and the front 134 have trusses 170, 171, 172, and/or 173 or other sliding supports attached to their bottom edges such that when the panels are in the fully erected position, the trusses 170, 171, 172, and/or 173 provide support. That is, side and front panels may not have an ability to provide support to the base when erected into an uncollapsed state, so the trusses 170, 171, 172, and/or 173 provide this support for them.

In an example, the collapsible storage container 130 may include a front door or panel that slides underneath the base, which may be integrated into the container 130 as part of the container unit, as part of a bed liner already installed on top of a truck bed, or the like.

In an embodiment, if the front door of the container 130 is pulled out and "flipped up" or in the fully erected position, then support that the front door provided to the floor of the container (e.g., whether an integrated bottom of the container 130 or part of an installed bed liner) is no longer provided. One or more trusses 170, 171, 172, and/or 173 or movable supports are installed on the bottom of the front door edge via hinges, allowing the trusses 170, 171, 172, and/or 173 to be pulled forward and provide support when the front door cannot due to its position.

In some embodiments, the bottom of the stow-away compartment 800 may be the bottom of the inside or interior of the collapsible storage container 130. For example, the bottom panel 132 may not be needed. Instead, the other panels may form a container around the stow-away compartment 800. This may expand the size of the interior of the collapsible storage container 130. However, when uncollapsed, the inside or interior of the collapsible storage container 130 extends above the floor 126 and into the open-top cargo area.

The stow-away compartment 800 may be used for various embodiments of the collapsible storage container 130. For example, a collapsible storage container 130 with bellows, as discussed in more detail below, may be placed in the stow-away compartment. In another example, a collapsible storage container 130 with one or more telescoping rods may be stored in the stow-away compartment 800. The telescoping rods may extend out of the stow-away compartment. In yet another example, a collapsible storage container 130 that is pivotable or retractable, as discussed in more detail below, may be stored in the stow-away compartment.

Figure 9A:
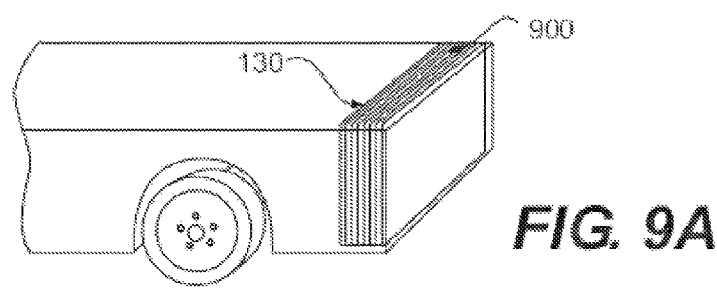
FIG. 9A-9C illustrate another example of a collapsible storage container that is being moved from a collapsed position to an uncollapsed position.
Figure 9B:
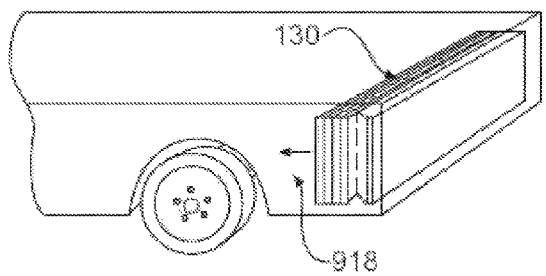
Figure 9C:
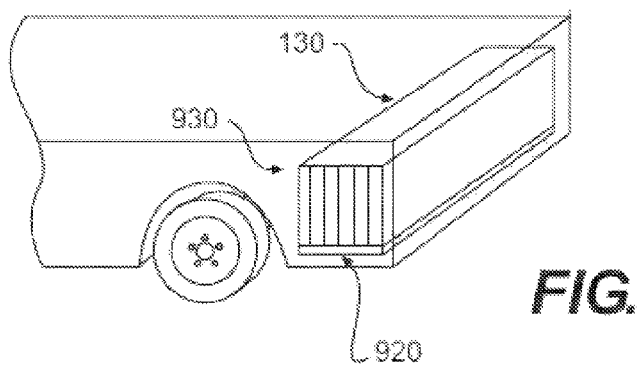

FIGS. 9A-9C illustrate another embodiment of a collapsible storage container 130 that is foldable. The collapsible storage container 130 includes bellows 900. The bellows 900 allow the collapsible storage container 130 to collapse, as shown in FIG. 9A. In this example, the bellows 900 are connected to the tailgate. As shown in FIG. 9B, the bellows 900 may be moved toward the front of the truck, as shown by arrow 910. FIG. 9C illustrates the collapsible storage container 130 that is uncollapsed. A support system may be used to maintain the collapsible storage container 130 in the uncollapsed position. FIG. 9C also shows a track, rail, or guide system that guides the collapsible storage container 130 when moved between the collapsed and uncollapsed positions. When the user is ready to move the collapsible storage container 140 into a collapsed position, the user may move the collapsible storage container 140 back toward the tailgate 124, as shown by arrow 930.

In an embodiment, a series (e.g., four) of rails (e.g., aluminum rails) may be provided parallel to each other and running from a tailgate of a truck to a cab of the truck. The rails are evenly spaced apart and lay on the truck bed. The collapsible storage container 130 fastens or otherwise attaches to the series of rails. If a user desired to reposition the container along the rails, the user loosens clamps or other attachments holding the container 130 to the rails and slides the container 130 along the rails to a desired position, for example.

In an embodiment, the container 130 may slide along the rails to the back of the cab or the back of the tailgate. The container 130 may "flip up" to rest vertically against the cab or the tailgate so as to not occupy unnecessary space in the truck bed, for example.

Retractable Storage Container(s)

Figure 10A:
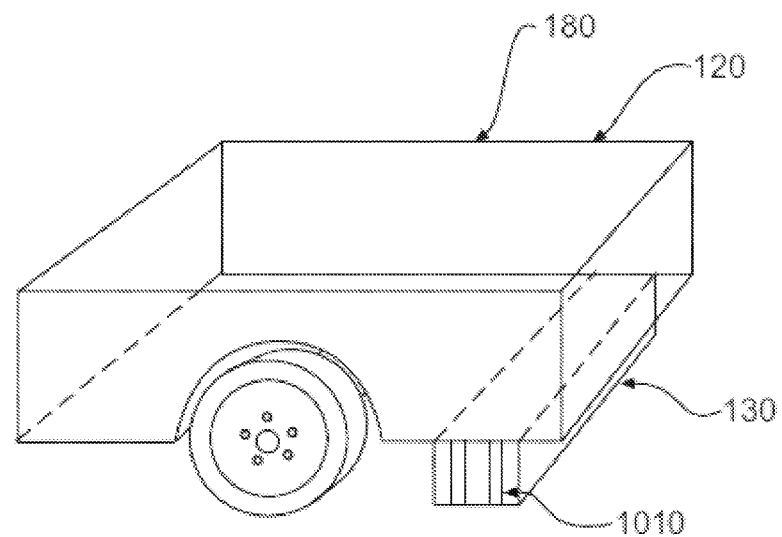
FIGS. 10A-10B illustrate another example of a collapsible storage container that is being moved from a collapsed position to an uncollapsed position.
Figure 10B:
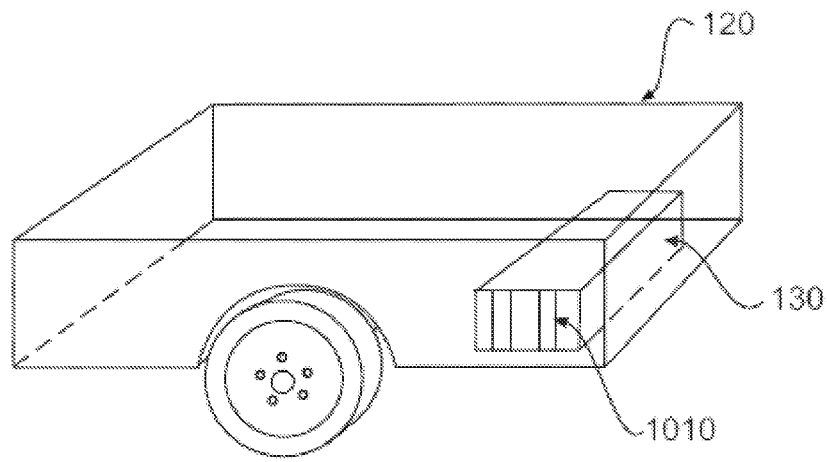

FIGS. 10A-10B illustrate a collapsible storage container 130 that is retractable. The collapsible storage container 130 retracts from the bed 120 of the truck 100. Retracting may include moving into and out of the bed 120.

FIG. 10A illustrates the collapsible storage container 130 in a collapsed position. The collapsible storage container 130 has been retracted out of the bed 120. For example, as shown in FIG. 10A, the collapsible storage container 130 may include or be attached to a guide system 1010 that allows the collapsible storage container 130 to move into and out of the bed 120. The guide system 1010 may include a rail, track, or other guidance system that allows the collapsible storage container 130 to move between the collapsed and uncollapsed positions.

The collapsible storage container 130 may be locked in the collapsed position and/or the uncollapsed position. For example, a pin may be inserted into a hole of the guide system 1010 to maintain the collapsible storage container 130 in a fixed position. The pin may be removed to collapse or uncollapse the collapsible storage container 130.

In FIG. 10A, the top panel of the collapsible storage container 130 may be used as part of the bed 120. For example, when collapsed, the top panel may be flush with the bottom of the bed 120. In another example, a door may be placed over the top of the collapsible storage container 130. When in the collapsed position, the door may be closed. The door may be part of the bed 120 of the truck 100. The door may be opened to allow the collapsible storage container 130 to be uncollapsed.

It is noted that in the collapsed position, the interior of the collapsible storage container 130 may not be accessed. However, in some embodiments, the interior of the collapsible storage container 130 may be accessed in the collapsed position. For example, a door may be provided in the top panel and allow access to inside or interior of the collapsible storage container 130. Because the collapsible storage container 130 maintains the same shape in both the collapsed and uncollapsed position, the interior may be accessed, for example. Alternately, or additionally, the collapsible storage container 130 may be accessed underneath the floor of the bed of the truck. This may be beneficial, for example, if the bed 120 is being used to haul or carry cargo (e.g., rocks, wood, or other supplies).

FIG. 10B illustrates the collapsible storage container 130 in an uncollapsed position. In the uncollapsed position, all or at least substantially all of the inside or interior of the collapsible storage container 130 may be located above the floor of the bed of the truck. For example, the collapsible storage container 130 may be moved up, for example, using a handle or lever, above the floor of the bed of the truck.

Pivotable Storage Container(s)

Figure 11A:
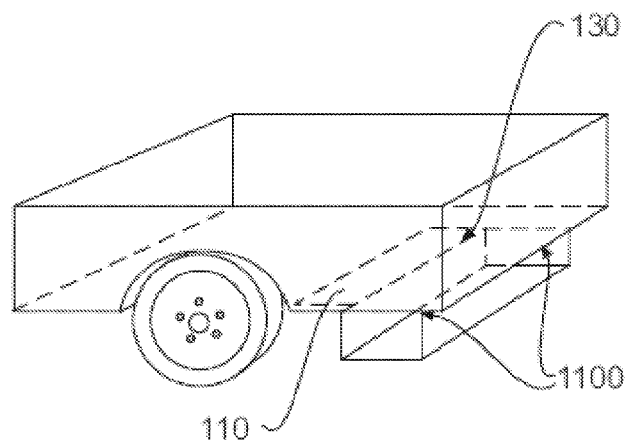
FIG. 11A-11B illustrate another example of a collapsible storage container that is being moved from a collapsed position to an uncollapsed position.
Figure 11B:
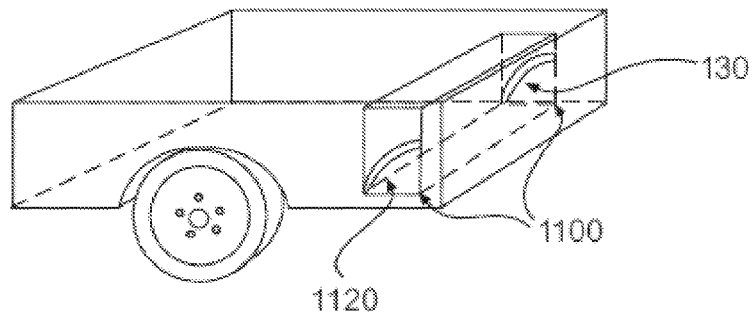

FIGS. 11A-11B illustrate a collapsible storage container that is pivotable. FIG. 11A illustrates the collapsible storage container 130 in a collapsed position. The collapsible storage container 130 has been pivoted out of the bed 120. For example, as shown in FIG. 11A, the collapsible storage container 130 may include or be attached to a pivot system 1100 that allows the collapsible storage container 130 to pivot into and out of the bed 120. The pivot system 1100 may include a pin, swivel, or other system that allows the collapsible storage container 130 to pivot.

The collapsible storage container 130 may be locked in the collapsed position and/or the uncollapsed position. For example, a pin may be inserted into a hole of the guide system 1010 to maintain the collapsible storage container 130 in a fixed position. The pin may be removed to collapse or uncollapse the collapsible storage container 130.

In FIG. 11A, the top panel of the collapsible storage container 130 may be used as part of the bed 120. For example, when collapsed, the top panel may be flush with the bottom of the bed 120. In another example, a door 1110 may be placed over the top of the collapsible storage container 130. When in the collapsed position, the door 1110 may be closed. The door may be part of the bed 120 of the truck 100. The door may be opened, as shown in FIG. 11A, to allow the collapsible storage container 130 to be uncollapsed.

In some embodiments, as shown in FIG. 11B, the collapsible storage container 130 may include a guide system 1120, which guides the collapsible storage container 130 as it is pivoted into and out of a collapsed and/or uncollapsed position. The guide system 1120 may be a track, for example.

It is noted that in the collapsed position, the interior of the collapsible storage container 130 may not be accessed. However, in some situations the interior of the collapsible storage container 130 may be accessed in the collapsed position. Because the collapsible storage container 130 maintains the same shape in both the collapsed and uncollapsed position, the interior may be accessed, for example, under the truck 100. This may be beneficial, for example, if the bed 120 is being used to haul or carry cargo (e.g., rocks, wood, or other supplies).

FIG. 11B illustrates the collapsible storage container 130 in an uncollapsed position (e.g., pivoted up from underneath the bed of the truck). In the uncollapsed position, all or at least substantially all of the inside or interior of the collapsible storage container 130 may be located above the floor of the bed of the truck. For example, the collapsible storage container 130 may be moved up, for example, using a handle or lever, above the floor of the bed of the truck.

Bed-Liner Storage Container(s)

A collapsible storage container may be connected to a bed liner. A truck bed liner is a covering that may protect a truck bed from damage and can prevent fine-grained cargo from moving around in the bed of the truck. A bed liner may be a drop-in bed liner. A bed liner is installed in the bed of the truck, for example, by snapping, screwing, or otherwise connecting the bed liner to the bed of the truck. A bed liner may be made of, for example, plastic, rubber, or other material. A bed liner may be made in a single piece (e.g., that is fitted to the bottom and sides of the bed of the truck) or separate pieces (e.g., that are installed individually on the bottom and sides of the bed of the truck). In some embodiments, a bed liner may be removable. A bed liner may or may not be pre-configured to accept a collapsible storage container. The collapsible storage container may be affixed to the bed liner by permanent (e.g., screws, bolts, rivets, etc.) or non-permanent (e.g., hook-and-loop, straps, ties, etc.) connection(s).

Figure 12A:
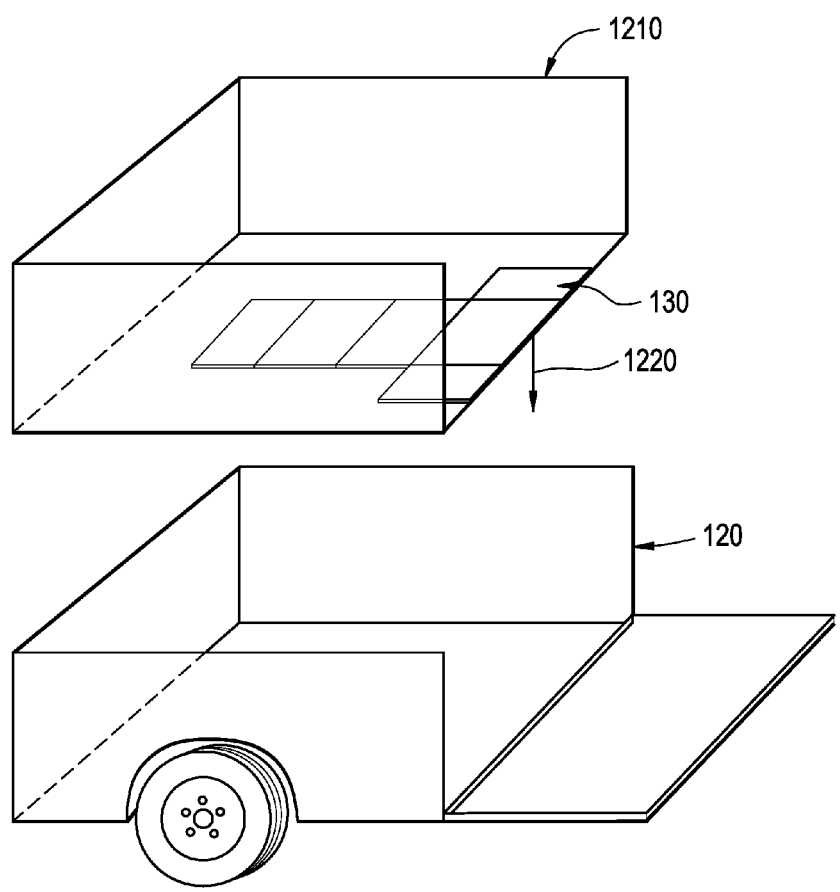
FIG. 12A-12E illustrate examples of a bedliner that is configured to receive a collapsible storage container.
Figure 12B:
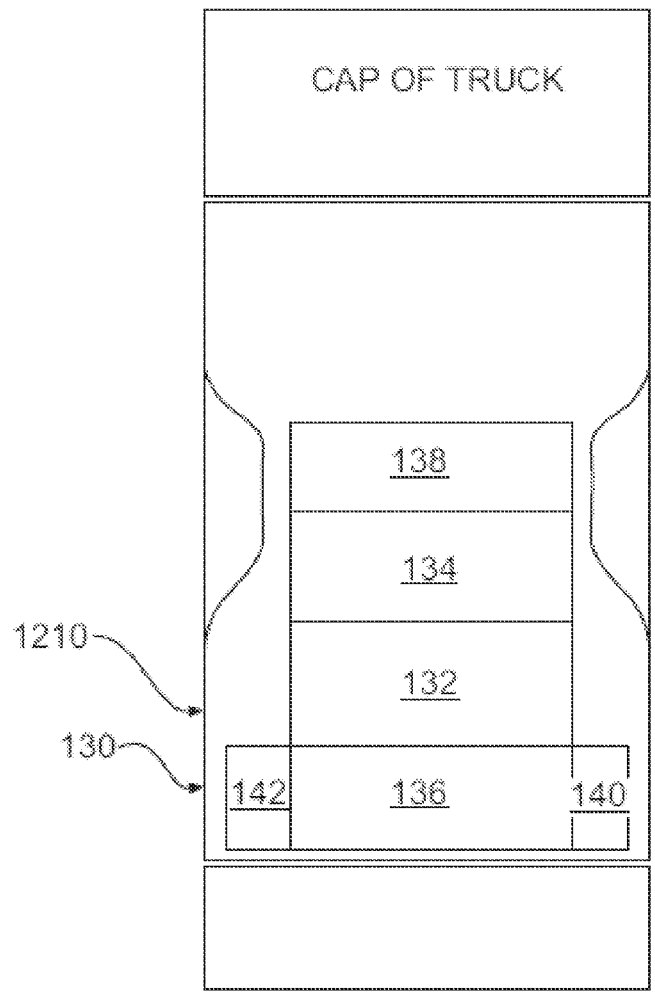

In some embodiments, as shown in FIGS. 12A-12B, a collapsible storage container 130 is embedded in a bed liner 1210. Embedded may include manufactured with (e.g., as a single piece), integrated with, built into, or otherwise formed with the bed liner 1210. For example, during manufacture of a bed liner, one, some, or all of the panels of a collapsible storage container may be manufactured into the bed liner to allow for the use of a collapsible storage container when the bed liner is installed in the bed of a truck. The collapsible storage container, when manufactured as a single piece with the bed liner may not be removed from the bed liner. For example, during manufacture, a single injection molding process may be used to form both the bed liner and the collapsible storage container.

FIG. 12A illustrates a collapsible storage container 130 embedded in a bed liner 1210 that has not been installed in the bed of the truck. The arrow 1220 illustrates that the bed liner 1210 may be installed in the bed 120 of the truck. Once the bed liner 1210 is installed in the bed 120, the collapsible storage container 130 may be collapsed and uncollapsed. The collapsible storage container 130, when in a collapsed position, may be used as the bed liner 1210. FIG. 12B illustrates the bed liner 1210 installed in the bed 120 of the truck. The collapsible storage container 130 is collapsed. Accordingly, the interior walls of the collapsible storage container 130 may be used as part of the bed liner 1210.

Figure 12C:
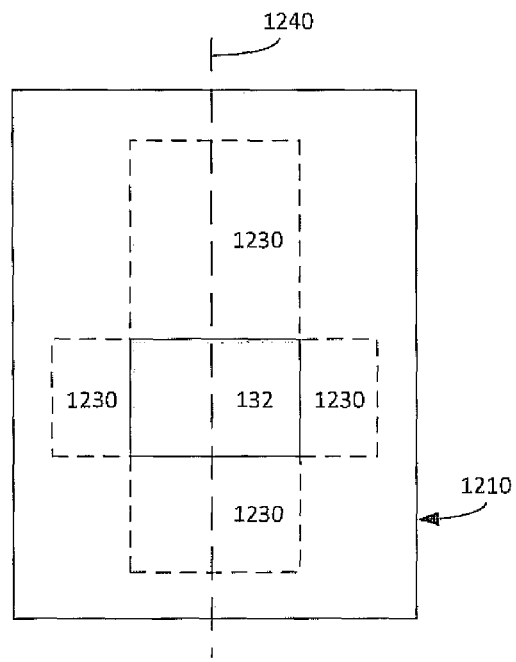
Figure 12D:
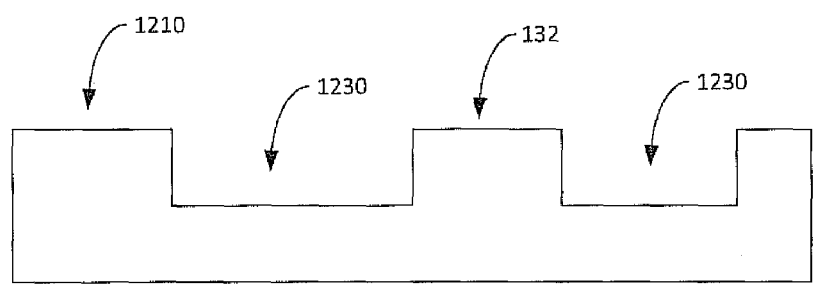

FIG. 12B illustrates a top view of a collapsible storage container 130 that is embedded in a bed liner 1210. In this example, the bottom panel 132 is formed with the bed line 1210 during the manufacturing process. For example, as shown in FIG. 12C, the bed liner 1210 may be formed with indentations 1230 surrounding (e.g., adjacent to) the bottom panel 132, which is formed as part of the bed liner 1210. FIG. 12D illustrates a side view of cross section 1240 (from FIG. 12C) of the bed liner 1210. As shown in FIG. 12D, the bottom panel 132 is formed as part of the bed liner 1210. One or more of the other panels (e.g., 134-142) may be formed with the bottom panel 132. Otherwise, they may be connected after manufacture, for example, using hinges.

Figure 12E:
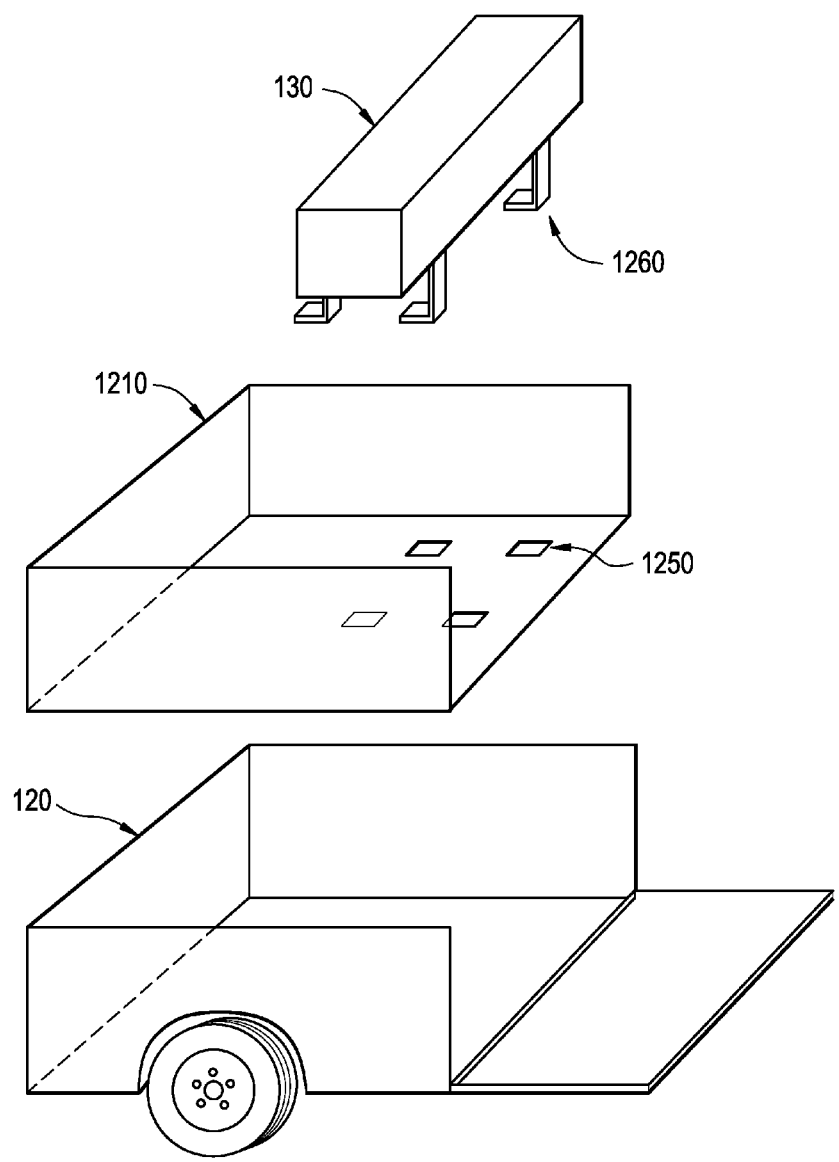

FIG. 12E illustrates another example of a bedliner 1210. The bedliner 1210 may be manufactured to receive a collapsible storage container 130. For example, when manufactured, the bedliner 1210 may be formed to include reception slots 1250. The reception slots 1250 may be sized and configured to receive one or more connection devices 1260 on the collapsible storage container 130. For example, prior to or after the bedliner 1210 is connected to the bed 120 of the truck, one or more connection devices 1260 may be inserted into the reception slots 1250. When inserted, the one or more connection devices 1260 may lock into the reception slots. This may lock the collapsible storage container 130 into place and prevent the collapsible storage container 130 from moving around.

In an embodiment, the bedliner 1210 may be manufactured with the indentations of FIGS. 12C and 12D; however, the bedliner 1210 with the reception slots does not need to include the indentations. Depending on where the connection devices 1260 are located on the collapsible storage container 130, the reception slots may be located in other places of the bedliner 1210. For example, the reception slots may be located on the side walls of the bedliner 1210.

FIG. 12E illustrates an example of a bedliner 1210 that is configured to receive or connect to a collapsible storage container. Other mechanisms may be built into the bedliner to connect the bedliner to the collapsible storage container. For example, the sides of the bedliner may include indentations as the reception slots. The collapsible storage container 130 may include one or more spring loaded rod on the side of the collapsible storage container 130. The spring loaded rod may extend when placed inside the indentation of the bed liner.

In an embodiment, a collapsible storage container is attached to a bedliner, such as the bedliner 1210, that is shaped to cover the bottom of the bed of a pickup truck. In an embodiment, the bedliner 1210 matches the shape of the bottom of the truck bed including sides. In an embodiment, the bedliner 1210 matches the shape of the bottom of the truck bed without sides.

Electronic System for One or More Collapsible Storage Containers

Figure 13:
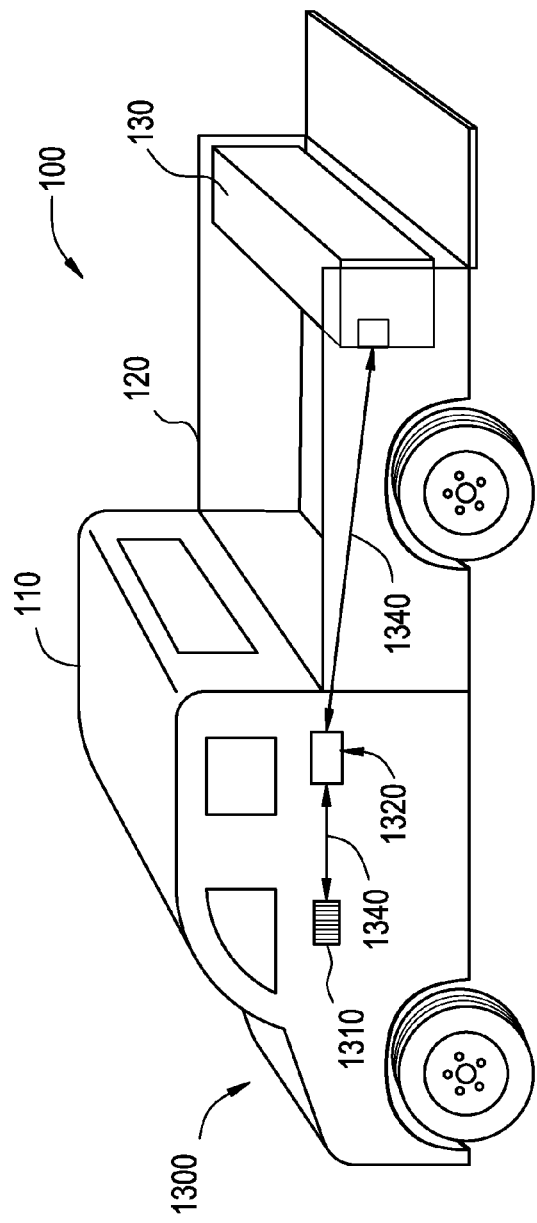
FIG. 13 illustrates an example of an electronic system that controls a collapsible storage container.

FIG. 13 illustrates an embodiment of a system 1300 for electronically collapsing or uncollapsing a collapsible storage container in a bed 120 of a truck 100. The system 1300 includes an input device 1310, a computing device 1320, a movement device 1330, a communication network 1340, and a collapsible storage container 130. Additional, different, or fewer components may be provided.

The communication network 1340 may communicatively couple the input device 1310 and movement device 1320 with the computing device 1320. The computing device 1320 may provide overall control for the collapsible storage container 130. The computing device 1320 and input device 1310 may be indirectly coupled with the computing device 1320 via the movement device 1330.

The input device 1310 may be a switch, button, or other now known or later developed control device that is used to control the movement device 1330 and as a result the collapsible storage container 130. The input device 1310 may be located in the cab 110 or the bed 120 of a truck 100. For example, in some embodiments, the input device 1310 and computing device 1320 are located in the cab 110 of a truck 100, while the collapsible storage container 130 is located in the bed 120. In another example, the input device 1310 is located in the bed 120, for example, on, near, or adjacent to the collapsible storage container 130 or on a wall of the bed 120.

The movement device 1330 may be a motor that provides movement to the collapsible storage container 130. The movement may collapse or uncollapse the collapsible storage container 130. For example, the movement device 1330 may fold, retract, pivot or otherwise collapse the collapsible storage container 130. However, the movement device 1330 may unfold, unretract, unpivot the collapsible storage container 130, such that the collapsible storage container 130 may be used as a storage container. The movement device 1330, as well as other components of the system 1300, may receive power from a power source of the truck 100. The movement device 1320 may be controlled by the computing device 1320.

The computing device 1320 may be an electronic device that is operable to store, retrieve, process, or a combination thereof data.

The computing device 1320 may provide overall control of the collapsible storage container 130. For example, the computing device 1320 may control the movement device 1330 based on input from the input device 1310. For example, the input device 1310 may send a signal to collapse the collapsible storage container 130. The computing device 1320 may control the movement of the movement device 1330 to collapse the collapsible storage container 130. In another example, the input device 1310 may send a signal to uncollapse the collapsible storage container 130. The computing device 1320 may control the movement of the movement device 1330 to uncollapse the collapsible storage container 130.

Figure 14:
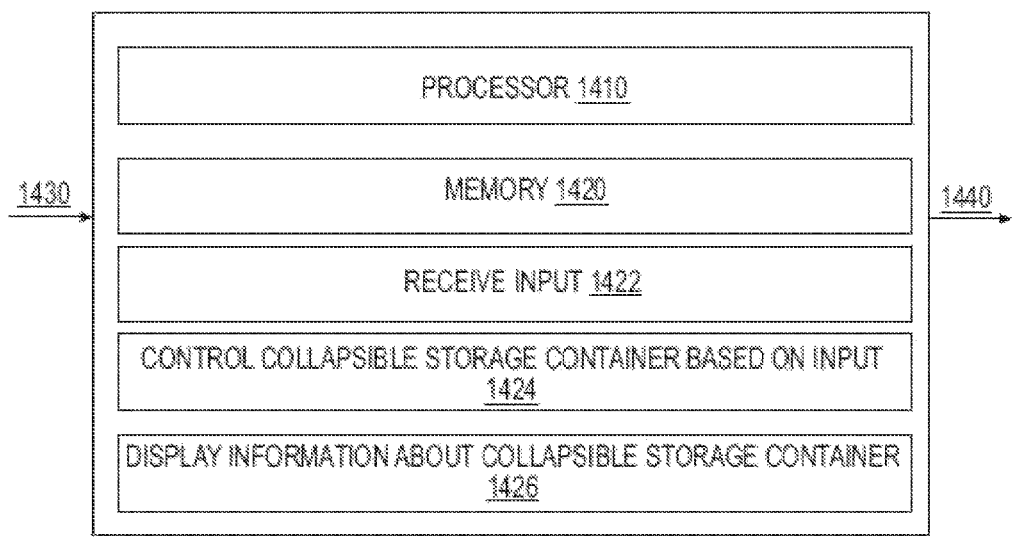
FIG. 14 illustrates an example of a computing device that controls a collapsible storage container.

FIG. 14 illustrates an example of a computing device that provides overall control of a collapsible storage container. The computing device is operable to move a collapsible storage container from a collapsed position into an uncollapsed position and vice-versa, according to an embodiment.

In the example of FIG. 14, the computing device 1400 includes a processor 1410 and a memory 1420. The computing device 1400 may include additional, different or fewer components. For example, the computing device 1400 may include a display device (e.g., touch screen, dashboard display device) that displays information. The display device may display information relating to collapsing and uncollapsing the collapsible storage container (e.g., percentage of completion, status, etc.). In another example, the computing device 1400 may include an input device (e.g., mouse, keyboard, touchscreen, etc.)

The processor 1410 may be a general processor, digital signal processor, application specific integrated circuit, field programmable gate array, analog circuit, digital circuit, programmed processor, combinations thereof, or other now known or later developed processing device. Although shown as a single device, the processor 1410 may be a combination of processors. The processor 1410 is responsive to computer readable instructions stored in the memory 1420. For example, the processor 1410 may execute one or more computer readable instructions. Computer readable instructions may include logic encoded in one or more tangible media.

The memory 1420 is computer-readable storage media. Computer-readable storage media includes various types of volatile and non-volatile storage media. Examples of computer-readable storage media include but are not limited to a random access memory, a read-only memory, and a hard disk drive. The memory 1420 may be configured to store data that may be accessed by the processor.

As shown in the example of a FIG. 14, the memory 1420 may include computer readable instructions (e.g., may be referred to as "instructions"). For example, the memory 1420 may include instructions to receive an input 1422, instructions to control a collapsible storage container based on the input 1424, and instructions to display information about the collapsible storage container 1426. The memory 1420 may include additional, different, or fewer instructions.

The instructions 1422 may be executed to receive an input 1430 from an input device, a movement device, a collapsible storage container, or other device associated with collapsing and uncollapsing a collapsible storage container. For example, the instructions 1422 may be used to receive an input signal from an input device. The input signal may include a command to collapse or uncollapse all or a portion of the collapsible storage container.

The instructions 1424 may be executed to control a collapsible storage container based on the received input. Controlling the collapsible storage container may include sending a output 1440 to a movement device that collapses and uncollapses the collapsible storage container. The output 1440 may include a control signal. For example, the instructions 1424 may cause a motor to move and as a result move the collapsible storage container.

The instructions 1426 may be executed to display information about a collapsible storage container 1426. The output 1440 may be used when displaying information. For example, the output 1440 may be provided to a display device and indicate a percentage of completion (e.g., 50% collapsed, 25% remaining, or 10% uncollapsed) may be displayed on the display device. This information may be displayed. In another example, a status of the collapsible storage container may be displayed. For example, the display may indicate that the collapsible storage container is collapsed or uncollapsed. More specific information may also be provided. For example, the display may indicate that one or more of the panels are open and/or the collapsible storage container is locked/unlocked.

Figure 15:
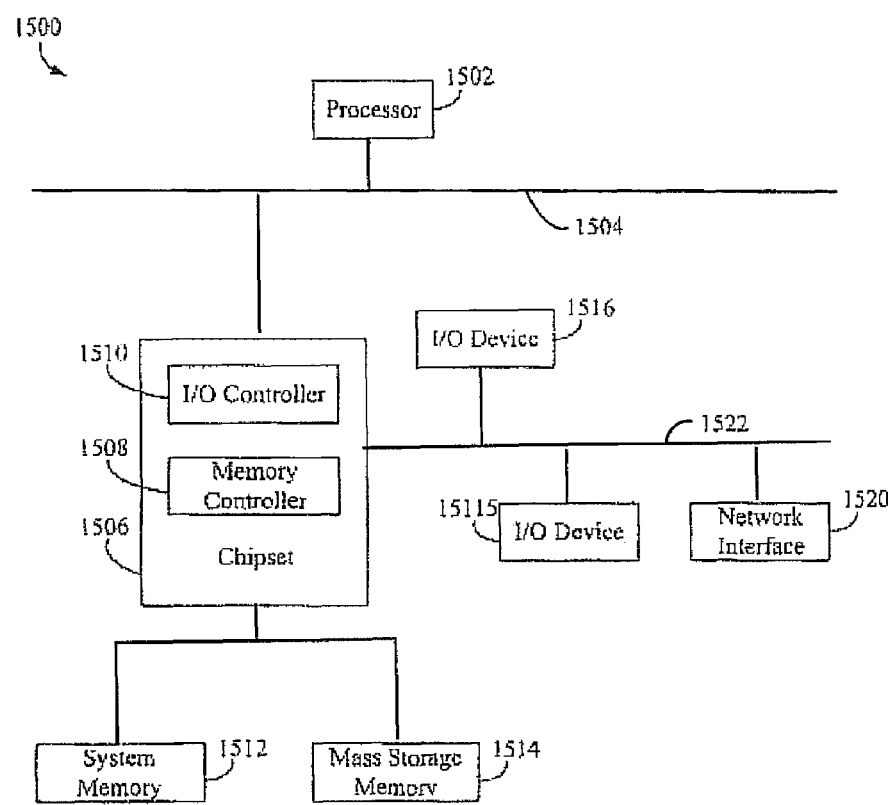
FIG. 15 illustrates another example of an electronic system that controls a collapsible storage container.

FIG. 15 is a block diagram of an example electronic system 1500 that can be used to implement the apparatus and methods described herein. As shown in FIG. 15, the processor system 1500 includes a processor 1502 that is coupled to an interconnection bus 1504. The processor 1502 may be any suitable processor, processing unit, or microprocessor. Although not shown in FIG. 15, the system 1500 can be a multi-processor system and, thus, can include one or more additional processors that are identical or similar to the processor 1502 and that are communicatively coupled to the interconnection bus 1504.

The processor 1502 of FIG. 15 is coupled to a chipset 1506, which includes a memory controller 1508 and an input/output (I/O) device 1510. A chipset typically provides I/O and memory management functions as well as a plurality of general purpose and/or special purpose registers, timers, etc. that are accessible or used by one or more processors coupled to the chipset 1506. The memory controller 1508 performs functions that enable the processor 1502 (or processors if there are multiple processors) to access a system memory 1512 and a mass storage memory 1514.

The system memory 1512 can include any desired type of volatile and/or non-volatile memory such as, for example, static random access memory (SRAM), dynamic random access memory (DRAM), flash memory, read-only memory (ROM), etc. The mass storage memory 1514 can include any desired type of mass storage device including hard disk drives, optical drives, tape storage devices, etc.

The I/O device 1510 performs functions that enable the processor 1502 to communicate with peripheral input/output (I/O) devices 1516 and 1518 and a network interface 1520 via an I/O bus 1522. The I/O devices 1516 and 1518 can be any desired type of I/O device such as, for example, a keyboard, a video display or monitor, a mouse, etc. The network interface 1520 may be, for example, an Ethernet device, an asynchronous transfer mode (ATM) device, a 1502.11 device, a DSL modem, a cable modem, a cellular modem, etc. that enables the processor system 1500 to communicate with another processor system.

While the memory controller 1508 and the I/O device 1510 are depicted in FIG. 15 as separate blocks within the chipset 1506, the functions performed by these blocks may be integrated within a single semiconductor circuit or may be implemented using two or more separate integrated circuits.

The processor 1502 may be operable to control a movement device 1524 and as a result a collapsible storage container 1526. For example, the processor 1502 may cause the collapsible storage container 1526 to move between a collapsed position and an uncollapsed position and vice-versa.

This may include being moved completely into the collapsed or uncollapsed position or an intermediary position (e.g., partially collapsed).

Accessing the Interior of a Collapsible Storage Container

Figure 16A:
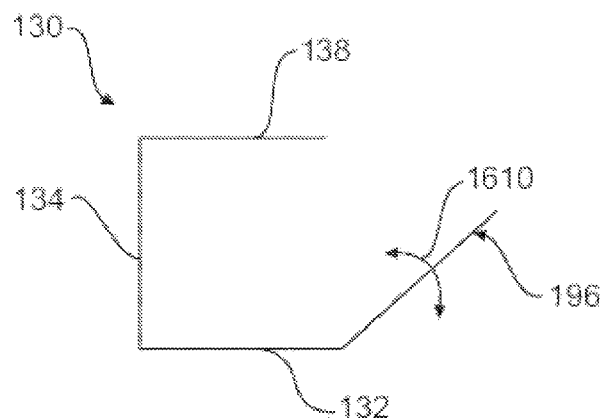
FIGS. 16A-16D illustrate examples of accessing a collapsible storage container when in an uncollapsed position.
Figure 16B:
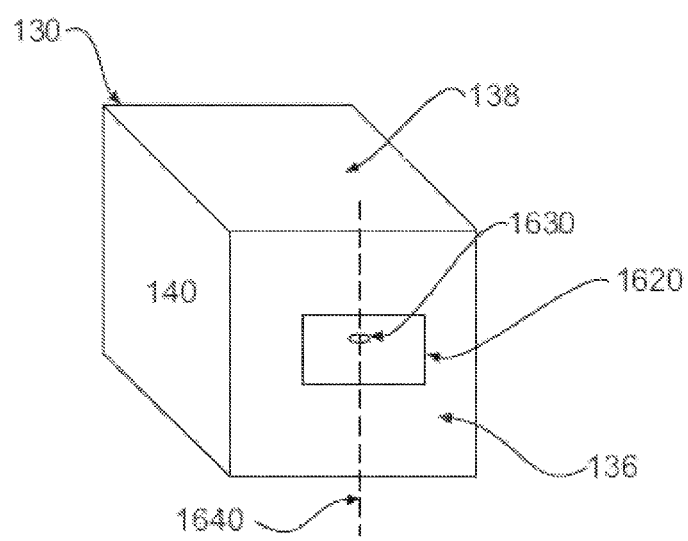
Figure 16C:
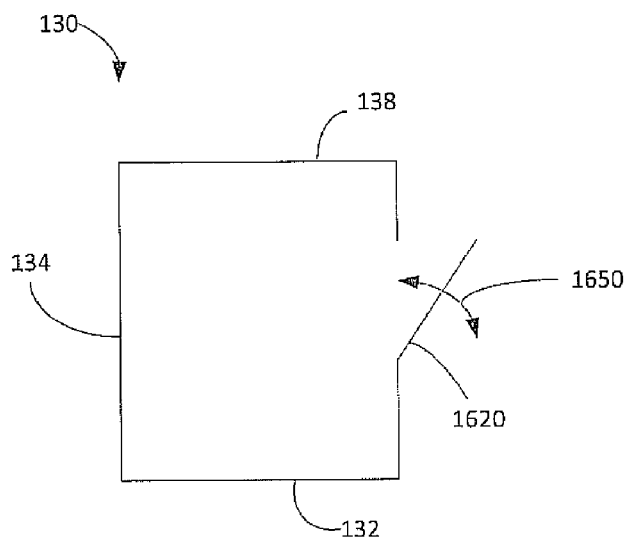
Figure 16D:
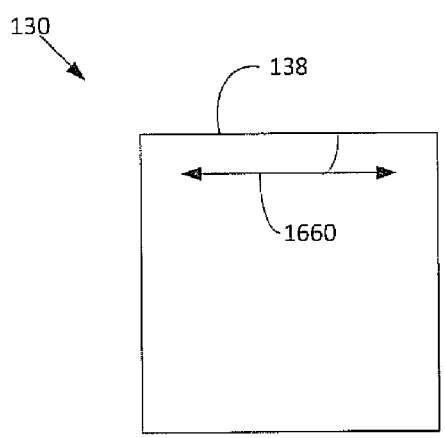

FIGS. 16A-16D illustrate various ways of accessing the inside or interior of a collapsible storage container 130. As shown in FIG. 16A, a connection system may allow the back panel 136 to open and close (shown by arrow 1610) even though the other panels 132-134 and 138-142 remain in a fixed (e.g., uncollapsed) position. As shown in FIG. 16B, the back panel 136 may include a door 1620 with a handle 1630. As shown in FIG. 16C, the door 1620 may open and close (shown by arrow 1650). FIG. 16C illustrates a cross-section of the collapsible storage container 130 along the cross-section 1640 of FIG. 16B. The handle 1630 may allow the door 1620 to latch shut. The door may be locked to prevent access to the interior. The lock may be unlocked, for example, using a key. In another embodiment, as shown in FIG. 16D, the top panel 138 may slide (shown by arrow 1660). Sliding the top panel 138, for example, either to the left or right, may provide access to the inside or interior of the collapsible storage container 130. In some embodiments, the top panel 138 may slide in either direction. However, in some embodiments, the top panel 138 may only slide in one direction (e.g., either to the left or right).

In an embodiment, instead of or as alternative to one or more of the sides opening to provide access to the inside of the collapsible storage container 130, one or more of the sides may include a door or opening that provide access to the inside. For example, a door, which is smaller than a side of the collapsible storage container may be opened and closed to provide and prevent access to the inside of the collapsible storage container 130.

Additional Folding Alternatives

Figure 17A:
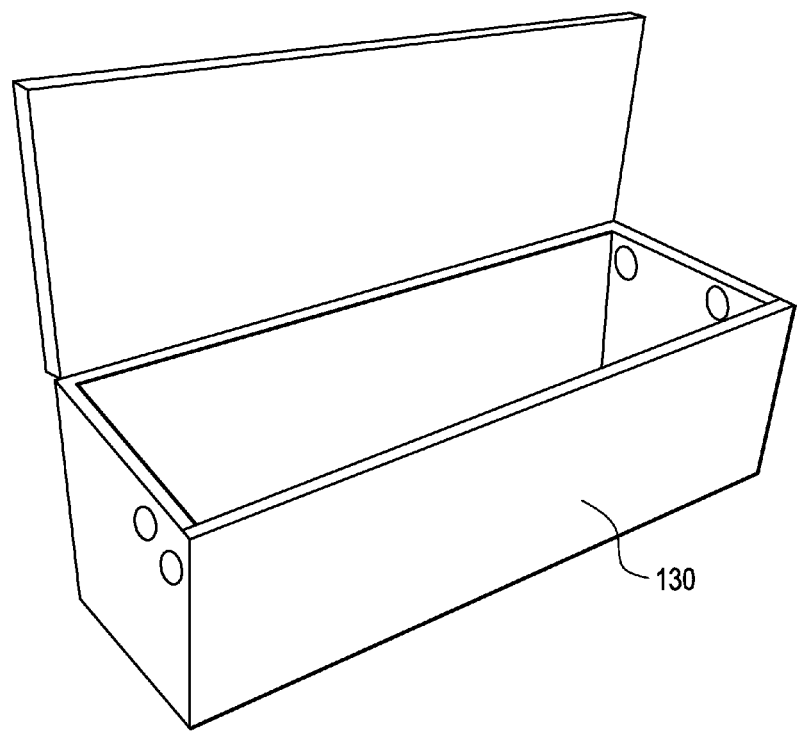
FIGS. 17A-17B illustrate an embodiment of a folding or collapsible automobile storage container.
Figure 17B:
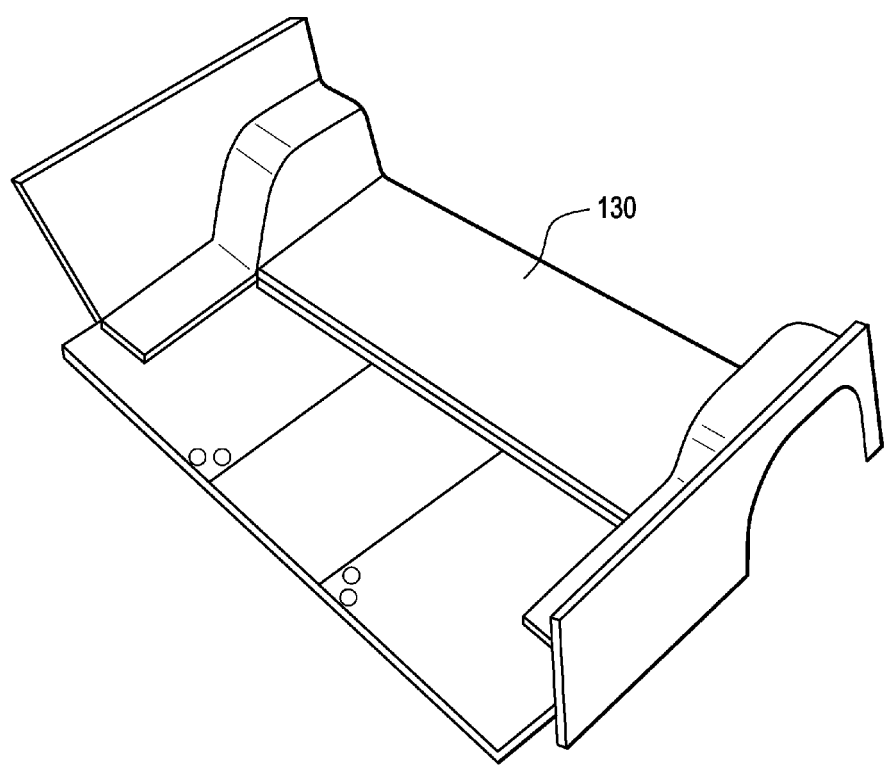

FIGS. 17A-17B illustrate an example fully erect storage container 130 (FIG. 17A) and the same example container 130 with top and sides collapsed (FIG. 17B).

Figure 18A:
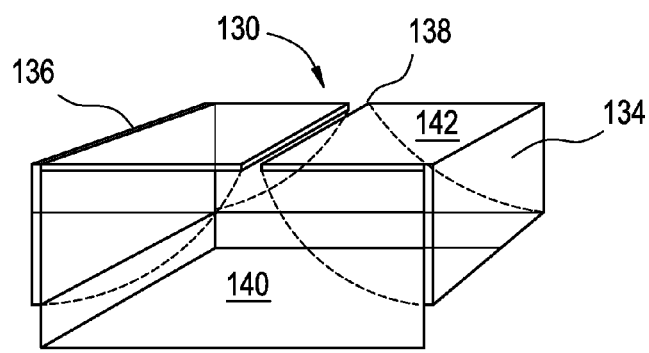
FIGS. 18A-18G illustrate an embodiment of a folding or collapsible automobile storage container.
Figure 18B:
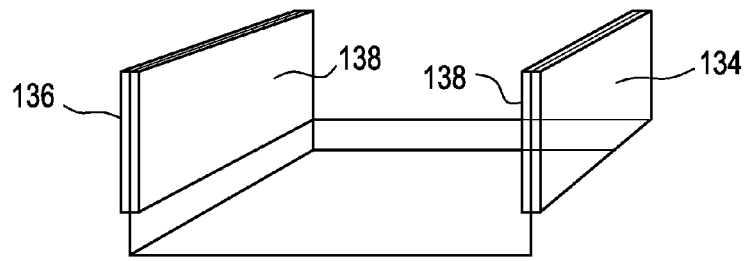

FIGS. 18A-18G illustrate an embodiment of a folding or collapsible automobile storage container 130. As illustrated in FIG. 18A, the top 138 of the container 130 is split and folds down parallel to front and back panels 134, 136 of the container 130. As shown in FIG. 18B, the top portions 138 are now parallel to the front and back parallel panels 134, 136 of the container 130. The top 138 could also be arranged to fold down parallel to the sides 140, 142 of the container 130.

Figure 18C:
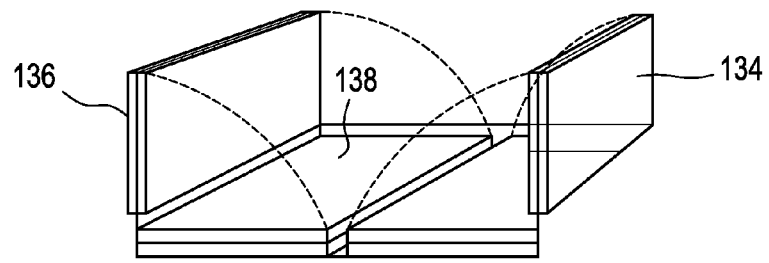
Figure 18D:
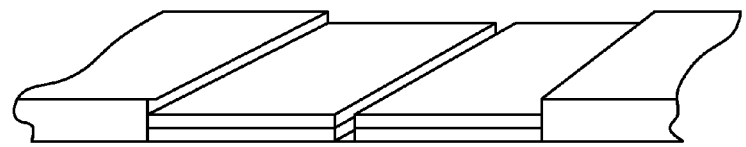

FIG. 18C illustrates that the top 138, front 134 and back 136 fold down and rest on the bottom of the "well" or recess to the truck bed or bedliner. As shown in FIG. 18D, the bottom and dies no rest on the bottom of the well.

Figure 18E:
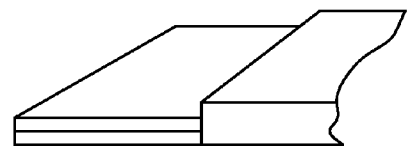
Figure 18F:
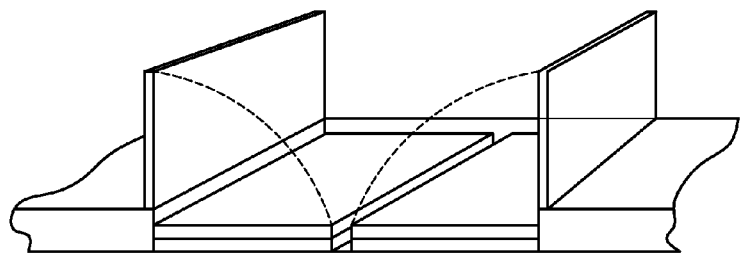
Figure 18G:
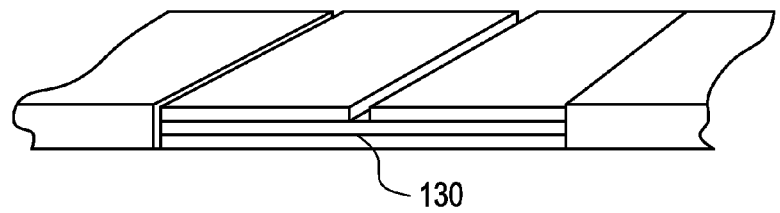

With the top, front and back panels resting on the bottom of the well (as shown in the example of FIG. 18E), the sides now fold over the pair (as shown in the example of FIG. 18F). FIG. 18G illustrates the container 130 in a collapsed state.

Figure 19A:
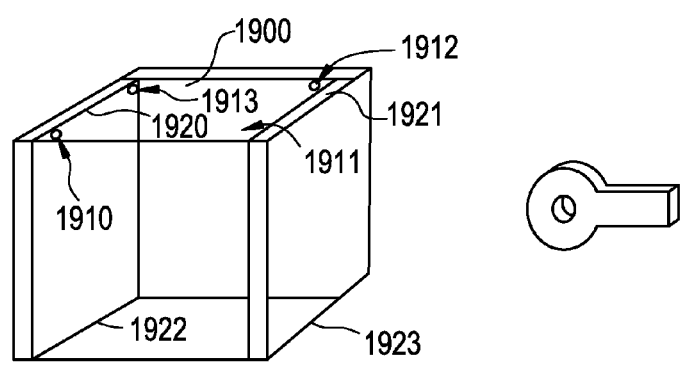
FIGS. 19A-19D illustrate an example collapsible fabric storage container.
Figure 19B:
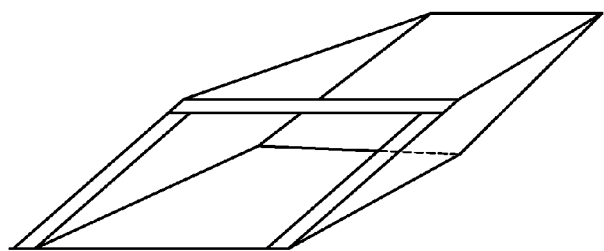
Figure 19C:
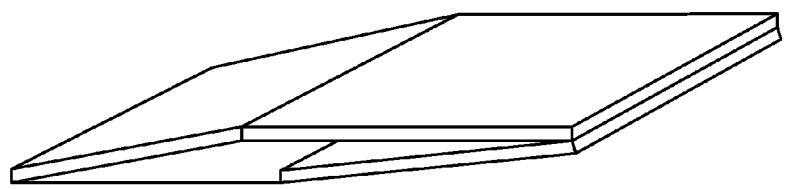
Figure 19D:

FIGS. 19A-19D illustrate an example collapsible fabric storage container 1900. Since the collapsible storage container 1900 has sides made of fabric, the container 1900 may fold down similar to the shape of a trapezoid. While the container 1900 is in a fully extended or erected position, the sides are "unlocked" by twisting clips 1910-1913 on the top to allow the two parallel sides to begin to lower in the same direction. The two sides remain connected to the top with hinges 1920-1921 and the base with hinges 1922-1923. As shown in FIG. 19A, the slip is a piece of plastic or metal that locks the sides together when turned one way and unlocks the sides when turned another way. FIG. 19B shows the container 1900 beginning to collapse. FIG. 19C shows the container 1900 almost completely collapsed. FIG. 19D shows the container 1900 in a completely collapsed state.

Figure 20A:
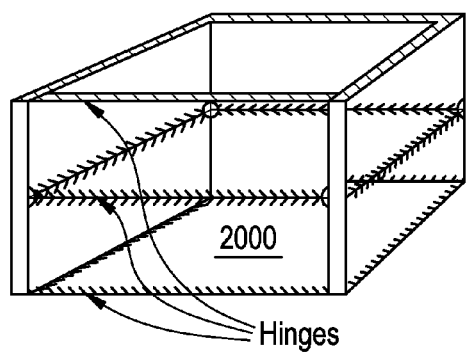
FIGS. 20A-20C illustrate an example hinged collapsible storage container.
Figure 20B:
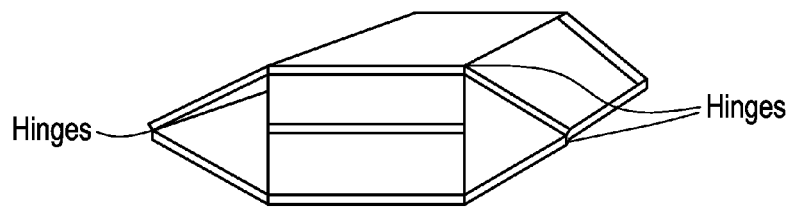
Figure 20C:
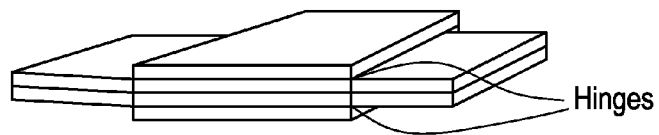

FIGS. 20A-20C illustrate an example hinged collapsible storage container 2000. In the container 2000 of FIG. 20A, all four sides of the collapsible container 2000 have horizontal hinges located on the bottom of all four sides, midway up (e.g., half way up or in the center) each side, and at the top, where the sides meet at the top or "lid" of the box. When the box is in its fully extended or erected state, the sides are "locked in" using clips, which when twisted in one direction provide rigidity to the sides. When the clips are twisted in the opposite direction, the clips allow the sides to fold down along the hinge line.

FIG. 20A shows the container 2000 with hinges in the open or fully formed state. FIG. 20B provides a side view of the container 2000 partially collapsed. FIG. 20C shows the box fully collapsed.

Figure 21A:
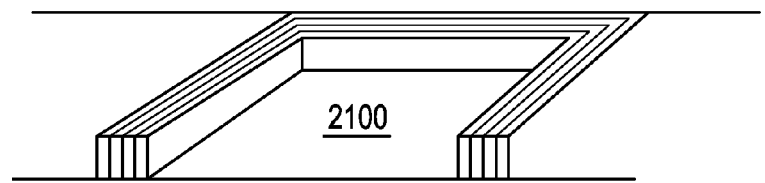
FIGS. 21A-21C illustrate an example collapsible storage container.
Figure 21B:
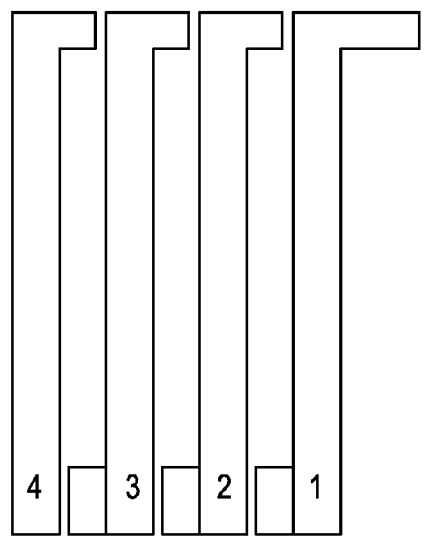
Figure 21C:
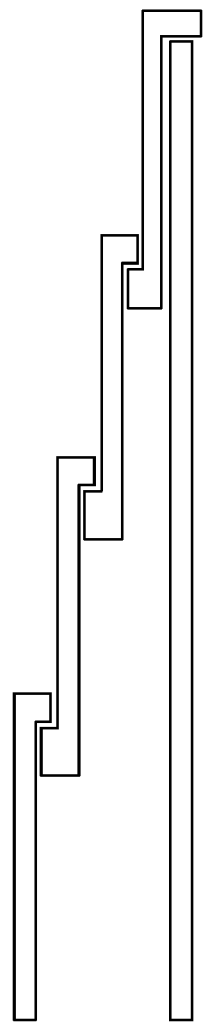

FIGS. 21A-21C illustrate an example collapsible storage container 2100. In the example of FIG. 21A, a "box in box" container 2100 is designed as a series of successively smaller (or larger, depending upon vantage or starting point) boxes. Each box has a bottom "lip" on the outside of the box at or near its bottom edge. The lip faces out. Each box has a top lip located at the top edge facing in. When the smallest of the boxes (e.g., the innermost box) is pulled up, the bottom lip grabs the top lip of the next larger box, pulling the next box up with the first box. This same action occurs when the second box is raised, resulting in all of the boxes being raised to their highest potential height. Once this occurs, supports (e.g., four blocks or sticks) are inserted into the corners of the inside box. The length of the sticks or blocks corresponds to the height of the fully erected container 2100, so sliding them under the bottom of the top lip located on the inside of the smallest box prevents the box from collapsing. To collapse the box, removing the supports from the corners allows the boxes to slide down inside each other by force of gravity, for example.

FIG. 21A provides an example side view showing a collapsed box with front panels removed for purposes of illustrative clarity. FIG. 21B shows a cross-section of four example boxes in a collapsed position. FIG. 21C shows a cross-section of an example fully extended container with supports inserted.

CONCLUSION

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A system comprising:
   a storage container that is configured to be moved into and out of a collapsed position, wherein the storage container includes an attachment system that is configured to connect the storage container to a bed of a vehicle and wherein the storage container includes an enclosed area that is located in a cargo area of the bed of the vehicle when the storage container is moved out of the collapsed position, the storage container providing a moisture-resistant enclosure using at least one of a tapered latch hook system and a tongue and groove panel system, the storage container further comprising a plurality of trusses attached to a front panel of the storage container to provide support to a base of the storage container when the front panel is in the uncollapsed position, each of the plurality of trusses having at a front and a side, the front of the truss being smaller than the side of the truss, the front of each truss attached to a bottom of the front panel, wherein the side of each truss is to be oriented along a direction of movement of the front panel, the front panel arranged to slide under the base of the storage container.

2. The system of claim 1, wherein the storage container is sized to fit between walls of the bed of the vehicle.

3. The system of claim 1, wherein the enclosed area forms the interior of the collapsible storage container.

4. The system of claim 3, wherein the storage container is weatherproof to protect one or more items placed in the enclosed area when out of the collapsed position.

5. The system of claim 1, wherein the storage container is located in the bed of the vehicle.

6. The system of claim 1, further comprising an attachment system that connects the storage container to the bed of the vehicle.

7. The system of claim 1, further comprising a connection system that connects two or more panels of the storage container together and allows the storage container to move into and out of the collapsed position.

8. The system of claim 1, wherein the storage container comprises a plurality of panels including at least one of plastic panels and fabric panels.

9. The system of claim 1, wherein the storage container is incorporated into a liner for the vehicle.

10. A collapsible automobile storage container, comprising:
a plurality of panels, arranged with respect to a base, that are configured to form an enclosed storage area in an automobile, wherein the plurality of panels are movable into a collapsed position and an uncollapsed position and wherein the plurality of panels includes at least a top panel, a front panel, and a back panel, the front panel movable to slide under the base of the container;
a connection system that connects the plurality of panels together, wherein the connection system allows the plurality of panels to be movable into the collapsed position and the uncollapsed position; and
a support system attached to the front panel to provide support when the front panel is in the uncollapsed position, wherein the support system includes a plurality of trusses attached to the front panel to provide support to the base when the container is in the uncollapsed position, each of the plurality of trusses having at a front and a side, the front of the truss being smaller than the side of the truss, the front of each truss attached to a bottom of the front panel, wherein the side of each truss is to be oriented along a direction of movement of the front panel to allow the plurality of trusses to be pulled forward with the front panel and to provide support to the base.

11. The collapsible storage container of claim 10, wherein the plurality of panels comprise at least one of plastic panels and fabric panels.

12. The collapsible storage container of claim 10, wherein the automobile comprises a truck, an all-terrain vehicle, or a trailer.

13. The collapsible storage container of claim 10, wherein the connection system includes tapered latch hooks.

14. The collapsible storage container of claim 10, wherein the connection system includes tongue and groove side panels.

15. The system of claim 10, wherein the storage container is incorporated into a liner for the automobile.

* * * * *

UNITED STATES PATENT AND TRADEMARK OFFICE
CERTIFICATE OF CORRECTION

| | |
|---|---|
| PATENT NO. | : 8,701,950 B2 |
| APPLICATION NO. | : 13/447163 |
| DATED | : April 22, 2014 |
| INVENTOR(S) | : Roach et al. |

Page 1 of 1

It is certified that error appears in the above-identified patent and that said Letters Patent is hereby corrected as shown below:

In the Claims

Column 24, line 34 (claim 15), Delete "system" and insert -- collapsible storage container --.

Signed and Sealed this
Twenty-eighth Day of October, 2014

Michelle K. Lee
*Deputy Director of the United States Patent and Trademark Office*